(12) United States Patent
Wasserman

(10) Patent No.: US 11,816,642 B2
(45) Date of Patent: Nov. 14, 2023

(54) BLOCKCHAIN DIGITAL CURRENCY: SYSTEMS AND METHODS FOR USE IN ENTERPRISE BLOCKCHAIN BANKING

(71) Applicant: Steven Victor Wasserman, Broadalbin, NY (US)

(72) Inventor: Steven Victor Wasserman, Broadalbin, NY (US)

(*) Notice: Subject to any disclaimer, the term of this patent is extended or adjusted under 35 U.S.C. 154(b) by 776 days.

(21) Appl. No.: 15/927,064

(22) Filed: Mar. 20, 2018

(65) Prior Publication Data
US 2018/0268382 A1     Sep. 20, 2018

Related U.S. Application Data

(60) Provisional application No. 62/473,557, filed on Mar. 20, 2017.

(51) Int. Cl.
*G06Q 20/06* (2012.01)
*G06Q 20/10* (2012.01)
*G06Q 20/36* (2012.01)
*G06Q 20/38* (2012.01)
*G06Q 20/22* (2012.01)

(52) U.S. Cl.
CPC ....... *G06Q 20/065* (2013.01); *G06Q 20/0655* (2013.01); *G06Q 20/10* (2013.01); *G06Q 20/223* (2013.01); *G06Q 20/3678* (2013.01); *G06Q 20/3823* (2013.01)

(58) Field of Classification Search
CPC .................................................. G06Q 20/389
See application file for complete search history.

(56) References Cited

U.S. PATENT DOCUMENTS

| | | | | |
|---|---|---|---|---|
| 2010/0217710 | A1* | 8/2010 | Fujita | H04L 9/3263 705/30 |
| 2014/0279540 | A1* | 9/2014 | Jackson | G06Q 20/381 705/44 |
| 2015/0170112 | A1* | 6/2015 | DeCastro | G06Q 20/381 705/39 |
| 2015/0371224 | A1* | 12/2015 | Lingappa | G06Q 20/401 705/71 |

(Continued)

FOREIGN PATENT DOCUMENTS

| WO | WO-2017006134 A1 * | 1/2017 | ......... G06Q 20/0658 |
|---|---|---|---|
| WO | WO-2018175504 A1 * | 9/2018 | ........... G06Q 20/065 |

OTHER PUBLICATIONS

Swan, Melanie, "Blockchain: Blueprint for a New Economy," O'Reilly Media, Inc., all pages. (Year: 2015).*

(Continued)

*Primary Examiner* — Jacob C. Coppola
(74) *Attorney, Agent, or Firm* — Pinnacle IP Strategies, LLC; Scott E. Scioli

(57) ABSTRACT

Methods and systems for using blockchain digital currency are provided herein. The methods and systems comprise a blockchain digital currency that is created and utilized on a permission-based network of financial institutions. The blockchain digital currency is created by a central authority and minted into circulation by banks within the network, and is backed by reserves of real world currency of any country. The digital currency can be used for any type of financial transaction, and the system provides security, trust, traceability and a detailed audit trail for all transactions.

18 Claims, 8 Drawing Sheets

(56) References Cited

U.S. PATENT DOCUMENTS

| | | | | |
|---|---|---|---|---|
| 2016/0012424 | A1* | 1/2016 | Simon | G06Q 20/36 |
| | | | | 705/67 |
| 2017/0300876 | A1* | 10/2017 | Musiala, Jr. | G06Q 20/36 |
| 2019/0057362 | A1* | 2/2019 | Wright | G06F 16/27 |
| 2019/0116024 | A1* | 4/2019 | Wright | G06F 9/22 |
| 2019/0303887 | A1* | 10/2019 | Wright | G06Q 20/385 |

OTHER PUBLICATIONS

Danezis et al., "Centrally Banked Cryptocurrencies," International Association for Cryptologic Research, vol. Dec. 18, 2015:092419, pp. 1-14. (Year: 2015).*

Peters et al., "Understanding Modern Banking Ledgers through Blockchain Technologies: Future of Transaction Processing and Smart Contracts on the Internet of Money," DOI 10.2139/ssrn.2692487, all pages. (Year: 2015).*

Written Opinion of the International Searching Authority, Application No. PCT/US2018/023441, Form PCT/ISA/237, 9 pages.*

* cited by examiner

BLOCKCHAIN DIGITAL CURRENCY: SYSTEMS AND METHODS FOR USE IN ENTERPRISE BLOCKCHAIN BANKING

BACKGROUND

Field of the Invention

This relates generally to blockchain digital currencies and systems and methods for their use. More particularly, this relates to virtual 'fiat' blockchain currency that is centrally issued and controlled, and systems and methods for private, permissioned blockchain financial systems that co-exist with and work seamlessly with any real-world currency, and which can utilize 'smart' electronic contracts among parties to the system.

Description of Related Art

Traditional currencies included coins having intrinsic value (e.g. gold, silver, and copper). Paper currency was traditionally issued by centralized issuers and was backed by reserves having intrinsic value (e.g. the 'gold standard'). In the $20^{th}$ century, the modern central banking system was developed and most official currencies were removed from the gold standard and/or backed by a fractional reserve system. Such "fiat money" was controlled by the central banks that issued it.

Over the years, various private parties have developed various private currencies, scrip, coupons, and such as alternatives to official currencies. However these were only available for limited purposes and their distribution was also limited. Since the widespread availability of the Internet and the worldwide web, some of these were effectively made available as 'virtual' currencies, but they still had very limited or specific uses and distribution.

In the last decade or so, digital currencies and cryptocurrencies, have emerged. Some of these currencies have had appeal for a number of reasons including their potential for privacy, security (provided via digital footprint), and independence from central banks and governments. And while they do not have intrinsic value—they can offer resistance to arbitrary inflation. These digital currencies represent an electronic store of value that have lately become a growing alternative to traditional real world currencies. Among the most popular or well-known digital currencies is BITCOIN™ ('BTC'), however there are at present hundreds of cryptocurrencies that have been developed over the last decade.

These currencies and transactions that are based on them can be secured by information that is kept/recorded in a database called a blockchain, which provides a verifiable 'public ledger'. The security includes e.g. a timestamp for each event and a digital hashtag to ensure integrity of the blockchain. The information can include details about the currency and specifics about its transfer from e.g. a payer to a payee. The blockchain database typically includes a distributed or peer-to peer feature, with a plurality of nodes on a network to validate and record transactions, and verify any modifications to the blockchain, where are in turn shared and validated independently to ensure and verify the ownership of currency.

Because of several, if not all of the foregoing features, such cryptocurrencies have often been attractive to criminal elements, and resisted by or repugnant to governments and central banks. Transactions that provide anonymity and such ease of transfer can avoid any oversight or control, by-pass the banking system and laws, and avoid taxation.

Notwithstanding these concerns, because of their rising popularity, in the last few years many businesses, including many online and traditional retailers have begun accepting e.g. BITCOIN for some transactions. Some banks and non-bank financial services companies began providing or enabling exchange and services. The tide continues to turn and governments, banks, and other non-bank financial services have realized that they too may be able to take advantage of many of the features of such currencies in the right circumstances.

Existing cryptocurrencies are generally decentralized. Rather than being minted or created by a central bank and based on a reserve or fractional reserve, new cryptocurrency 'coins' or 'tokens' are typically creating by a process called mining which involves searching, e.g. for specific solutions to a complex mathematical formulation, or numbers meeting specified criteria, typically of increasing complexity. Each solution discovered represents a unique 'coin' or 'token' of value and that unique information helps to identify the currency in the blockchain. The nature of this method of currency creation means anyone with sufficient computing power can create new currency—which has an inflationary effect (albeit one that is controlled by the rate at which new solutions can be found or 'mined' and/or the maximum number of solutions that exist for any given cryptocurrency). Moreover, most existing cryptocurrencies are not readily converted to cash, or exchanged in the various foreign exchanges, but banks and non-bank financial services firms are gradually adapting (see above).

While currency mining creates opportunities for independent/private businesses, it effectively cuts out the financial institutions. In addition, because of the completely decentralized creation process, the security of the cryptocurrency itself is to a greater or lesser extent offset or put at risk by the vulnerability of miners, digital exchanges, and other parties to malevolent electronic activities. Manipulations, security breaches, and financial misdeeds of significant proportions have been reported in these unregulated cryptocurrencies.

In addition to the foregoing, governments have begun to publicly recognize certain limitations to traditional physical currencies, not limited to the expenses of printing, minting, maintaining, and circulating such currencies, providing equal access to all to the currency and banking systems, and collecting taxes from unreported transactions (e.g. unreported transactions, and underground economy including 'under the table' paid work, as well illicit activities).

The existence of a large 'unbanked' population that does not participate in conventional banking results from a variety of reasons including the lack of available banking services in unserved or underserved communities. This unbanked culture creates multi-faceted problems, including an 'underground' cash economy, and a disparate economic reality for people who are excluded from the system.

In order to overcome some of the challenges or shortcomings of traditional physical currencies (including providing improved access to the unbanked), proposals are being made to consider use of cryptocurrencies, or to create and test their own cryptocurrencies. Several jurisdictions, including India and the European Union are looking at proposals for actually going 'cashless'. Still more recently, tremendous volatility in the cryptocurrency markets and spectacular gains and losses by cryptocurrency 'investors', as well as stories of unscrupulous tactics by those promoting certain Initial Coin Offerings (ICOs), or 'pump and dump' schemes has prompted still more governments and central banks to consider methods for regulating these products to protect consumers. A more robust and centralized blockchain-based digital currency system may be needed.

Thus, while it is clear that we may be on the cusp of a massive cultural change, to date, there have been no truly workable cryptocurrency systems that enable central creation and control of a digital currency that includes many of the advantages and benefits of blockchain digital currencies while allowing control (by financial institutions, central authorities (including central banks), or governments (through regulation and the like) over e.g., the value of the currency, the reserve requirements and other regulations for participating financial institutions, and the minting of new currency in accordance with set rules. Unlike prior art systems, such systems could work seamlessly with real world currencies and allow instant conversion from and to any traditional real world currency. Ideally such a digital currency system would allow exchange of digital currencies into different "fiat" real world currencies through a virtual foreign exchange similar to how currencies are currently exchanged around the world.

There is therefore a need for new and improved systems comprising centralized blockchain digital currencies established by central authorities and financial institutions, and methods for using these systems and currencies for business transactions in a secure and convenient environment.

SUMMARY

Novel systems and methods for a blockchain digital currency in connection with an entire financial system that includes a central authority, a plurality of financial institutions of which at least one or more are banks, and that works in conjunction with traditional real world currencies.

In a first of its several aspects, this disclosure provides private permissioned systems using blockchain digital fiat currencies that are established and controlled by agreement of a group of financial institutions who are authorized to 'mint' or circulate electronic representations of real world currency useful in a variety of financial transactions including but not limited to consumer-to-consumer ("C2C"), consumer-to-business ("C2B"), business-to-consumer ("B2C"), and business-to-business ("B2B").

The systems thus generally comprise:
a) a plurality of electronic tokens representing blockchain digital currency that is out of circulation in the system ("out-of-circulation tokens"), each such token comprising a blockchain including an out-of-circulation block comprising a plurality of the following data:
  1) a real world currency ID key;
  2) a null issuing financial institute (FI) key;
  3) a null issue timestamp;
  4) a null party name ID;
  5) a null party account ID;
  6) a null party 'transfer to' timestamp; and
  7) a value key equal to zero;
b) one or more unique digital security features on each out-of-circulation token to provide security and traceability, and to ensure authenticity for that token;
c) a plurality of electronic tokens for blockchain digital fiat currency that is in circulation in the system ("in-circulation digital currency"), each such token comprising a blockchain including the out-of-circulation block and further comprising an "in-circulation" block comprising a plurality of the following data:
  1) a real world currency ID key;
  2) an issuing financial institute (FI) key;
  3) an issue timestamp;
  4) a party name ID;
  5) a party account ID;
  6) a party 'transfer to' timestamp; and
  7) a value key specifying the value of the token expressed as the number of "minimal physical currency units" in circulation for the corresponding real world currency;
d) a plurality of participating financial institutions;
e) for each participating financial institution that is a qualified bank, a public/private mint key pair that allows the bank to digitally mint in-circulation digital currency by modifying the blockchain of out-of-circulation tokens by appending an in-circulation block thereto notwithstanding the unique digital security features thereon;
f) a central authority that creates and issues the out-of-circulation tokens, creates and implements the digital security features thereon, establishes permissions for parties to the system, and issues public/private mint key pairs for qualified banks, and public/private decryption key pairs to parties in accordance with their permissions;
g) a plurality of private servers, each comprising:
  1) non-volatile computer memory storing:
    i) one or more distributed databases comprising:
      (a) the out-of-circulation tokens; and
      (b) the in-circulation digital currency in the system;
    ii) computer readable instructions sufficient to limit access to the blockchains for out-of-circulation tokens to public/private mint key holders, to allow said key holder to append an in-circulation block to the keychain to digitally mint in-circulation digital currency;
    iii) computer readable instructions sufficient to allow the blockchains of in-circulation digital currency tokens to only be modified by public/private decryption key holders with sufficient permissions, and to append new blocks to said blockchains;
    iv) computer readable instructions sufficient to accurately store each blockchain so modified in the databases;
    v) computer readable instructions sufficient to create and store a unique timestamp corresponding to each such blockchain modification; and
  2) one or more processors capable of executing the computer readable instructions; and
h) a network comprising connections between the private servers including means for distributing the databases between the servers comprising private peer-to-peer connections, or other private permissioned connections, or an electronic portal for accessing said databases; such that the out-of-circulation tokens and the in-circulation digital currency tokens are preferably only accessible to the financial institutions having permission;
wherein the out-of-circulation tokens are created by fiat and not mined.

In various embodiments, the participating financial institutions comprise qualified banks and other (nonbank) financial services companies. In one embodiment, the financial institutions have their own virtual accounts and can hold minted in-circulation digital currency in their own virtual accounts.

In presently preferred embodiments the systems further comprise reserved funds in real world currency, which are provided by a qualified bank in proportion to the amount of in-circulation digital currency that is digitally minted by the bank from out-of-circulation tokens. The amount of such reserves can be determined by the initial agreement between e.g. the financial institutions, or between a central authority and the financial institutions. In one embodiment, the financial institutions and the central authority will determine the reserve requirements and other requirements of the system. Where the central authority is a central bank, its authority may be specific to currency controlled by that central bank. Government regulations, banking industry standards, and consumer attitudes may all factor into the nature and amount of such reserve funds in real world currency, as well as the specific manner in which they are held, and when and how they are released when in-circulation currency is redeemed. In one embodiment the total amount of in-circulation digital currency in the system is equal to the total reserved funds in real world currency held by the banks. In other embodiments, the reserves may be a fraction of the in-circulation currency.

The systems further comprise a plurality of virtual bank accounts, virtual credit accounts, and virtual foreign exchange accounts in various embodiments. Each such account is associated with a party who is a specific account holder that is a customer or consumer; a vendor, a merchant, a lender, or a borrower; or any combination thereof. Generally, each account holder has at least one account that is a virtual bank account, a virtual credit account, or a virtual foreign exchange account. As described above, the financial institutions have their own virtual accounts in some embodiments. Such accounts may be required for some or all participating financial institutions.

In a second of its several aspects, this disclosure provides methods for implementing a private permissioned blockchain digital fiat currency. The methods generally comprise the steps of:

a) establishing a central authority to issue a plurality of electronic tokens representing blockchain digital currency that is out of circulation in the system ("out-of-circulation tokens"), each such token comprising a blockchain; wherein the blockchain for each token includes an "out-of-circulation" block comprising a plurality of the following data:
1) a real world currency ID key;
2) a null issuing financial institute (FI) key;
3) a null issue timestamp;
4) a null party name ID;
5) a null party account ID;
6) a null party 'transfer to' timestamp; and
7) a value key wherein the quantity is zero;

b) including one or more unique digital security features generated by the central authority on each out-of-circulation token to provide security and traceability, and to ensure authenticity for that token;

c) recruiting a plurality of financial institutions to become parties by mutual agreement to a private permissioned network in connection with the digital fiat currency;

d) granting unique permissions to each of the financial institutions to identify each such financial institution in the system wherein each unique permission is granted by the central authority;

e) for each participating financial institution that is a qualified bank, generating, via the central authority, a unique public/private mint key pair that allows the bank to digitally mint in-circulation digital currency by modifying the blockchain of out-of-circulation tokens by appending an in-circulation block thereto notwithstanding the unique digital security features thereon;

f) providing a plurality of private servers, each comprising:
1) non-volatile computer memory storing:
    i) one or more distributed databases comprising:
        (a) the out-of-circulation tokens; and
        (b) the in-circulation digital currency in the system;
    ii) computer readable instructions sufficient to limit access to the blockchains for out-of-circulation tokens to public/private mint key holders, to allow said key holder to append an in-circulation block to the keychain to digitally mint in-circulation digital currency;
    iii) computer readable instructions sufficient to allow the blockchains of in-circulation digital currency tokens to only be modified by public/private decryption key holders with sufficient permissions, and to append new blocks to said blockchains;
    iv) computer readable instructions sufficient to accurately store each blockchain so modified in the databases;
    v) computer readable instructions sufficient to create and store a unique timestamp corresponding to each such blockchain modification; and
2) one or more processors capable of executing the computer readable instructions;

g) establishing a network among the private servers;

h) creating connections between the private servers on the network, including means for distributing the databases between the servers, said connections comprising private peer-to-peer connections, or other private permissioned connections, or an electronic portal for accessing said databases; such that the out-of-circulation tokens and in-circulation digital currency are accessible only to the financial institutions having permission to access said tokens;

i) for each bank electing to digitally mint an amount of in-circulation digital currency:
1) reserving funds in proportion to the amount of in-circulation digital currency the bank elects to digitally mint;
2) digitally minting the amount of in-circulation digital currency by modifying the blockchain for one or more out-of-circulation tokens by appending thereto an "in-circulation" block comprising a plurality of the following data:
    i) a real world currency ID key;
    ii) an issuing financial institute (FI) key;
    iii) an issue timestamp;
    iv) a party name ID;
    v) a party account ID;
    vi) a party 'transfer to' timestamp; and
    vii) a value key specifying the value of the token expressed as the number of "minimal physical currency units" in circulation for the corresponding real world currency; and
3) repeating steps i(1) and i(2) each time the bank elects to digitally mint an amount of in-circulation digital currency;

j) permitting a party that is a financial institution, customer, consumer, vendor, merchant with permission to use the in-circulation digital currency in one or more transactions; and k) recording the details of the transactions in one or more blocks appended to the blockchain of the in-circulation digital currency.

In yet another aspect, blockchain digital currencies are provided herein. These currencies, sometimes referred to herein as virtual fiat money (VFM) differ from other cryptocurrencies in several respects, and are similar to cryptocurrencies in other respects.

The blockchain digital currency are useful only within the context of a private, permissioned financial network. In general the blockchain digital currencies comprise:
  an electronic token having a blockchain;
  at least one digital security feature to enhance security, traceability, authenticity, or a combination thereof for that token;
  wherein if the currency is "out of circulation" in the private financial network, the value of the token is zero and the blockchain comprises an "out-of-circulation" block comprising a plurality of the following data:
  a) a real world currency ID key;
  b) a null issuing financial institute (FI) key;
  c) a null issue timestamp;
  d) a null party name ID;
  e) a null party account ID;
  f) a null party 'transfer to' timestamp; and
  g) a value key equal to zero;
  wherein if the currency is "in circulation" in the private financial network, the blockchain comprises an out-of-circulation block and further includes an "in circulation" block comprising a plurality of the following data:
  a) a real world currency ID key;
  b) an issuing financial institute (FI) key;
  c) an issue timestamp;
  d) a party name ID;
  e) a party account ID;
  f) a party 'transfer to' timestamp; and
  g) a value key specifying the value of the token expressed as the number of "minimal physical currency units" in circulation for the corresponding real world currency; and
  wherein if the currency is "in circulation" in the system, the value indicated in the quantity key corresponds to an amount of funds in real-world currency have been placed on reserve in the system by a bank having permission to put the digital currency into circulation in the system; and
  wherein the private currency is created by fiat as out-of-circulation tokens which cannot be "mined" or otherwise created such as by finding solutions to an algorithm, identifying complex numbers with particular properties, or the like.

In another of its several aspects, private networks for peer-to-peer financial transactions are provided. The private networks generally comprise a plurality of parties each having:
  1) a unique identity within the network;
  2) at least one virtual account in the private network; and
  3) a digital signing key unique to that party for authorizing peer-to-peer transactions.

The networks also comprise, for each peer-to-peer financial transaction, an electronic document comprising:
  1) at least the core terms of the peer-to-peer financial transactions;
  2) a unique identifier for that transaction;
  3) the identities of each party involved in the transaction;
  4) an authorization approval section for the document that requires use of the digital signing key unique to a party authorizing the transaction; and
  5) a timestamp corresponding to the time a party authorized the transaction;

The private networks also have a plurality of networked servers comprising at least one distributed database comprising electronic tokens representing the blockchain digital currency as disclosed herein, and the electronic document for each peer-to-peer financial transaction. In addition, the networks comprise a payment module comprising computer instructions capable of being executed on the network said instructions for transferring a specified amount of blockchain digital currency from the virtual account of a first party who authorizes a specified transaction comprising payment of the specified amount of the blockchain digital currency to the virtual account of a second party, upon authorization of the specified transaction using the digital signing key. In some embodiments, the first party can alternatively authorize a third party to make payment to the second party on behalf of the first party.

In various embodiments, the electronic document for each peer-to-peer financial transaction comprises a blockchain of data that provides security, traceability, and an audit trail for each transaction. Generally, if the authorization approval section for the electronic document for a transaction has been signed with the authorized key, the payment module is executed. The execution is preferably automatic and irrevocable, and substantially simultaneous with the authorization.

In yet another of its several aspects electronic contracts, i.e. "smart contracts" or "smart transactions" are provided herein. The smart transactions can range from a basic invoice or other simple financial transaction, to complete smart "agreements" that are negotiated and/or executed electronically and/or that have their payment obligations paid e.g. at a pre-approved date/time, with blockchain digital currency in the private systems disclosed herein.

Thus, methods are disclosed herein for transacting payments using blockchain digital currency in a private permissioned financial system. The methods comprising the steps of:
  a) identifying a first party requesting a payment in blockchain digital currency in the system from a second party, and a second party determining whether to make a payment of blockchain digital currency to the first party;
  b) ensuring that at least the first and second parties each hold at least one virtual account in the system, and have a unique identifier within the system;
  c) providing each of the first and second parties with a digital signing key unique to that party for authorizing or approving a payment of digital currency in the system;
  d) establishing electronic communications between the first and second parties within or without the system to communicate regarding a payment of digital currency within the system;
  e) communicating an invoice or smart transaction from the first party detailing the specified amount of payment of digital currency requested;
  f) recording the invoice or smart transaction in a database in the system;
  g) receiving the invoice or smart transaction by the second party; and
  h) processing the invoice or smart transaction by the second party.

If the invoice or smart transaction is approved for payment; the method further comprises signing the invoice or smart transaction in the database with the digital signing key and authorizing payment; followed by transferring the specified amount of blockchain digital currency from the virtual account of the second party to the virtual account of the first party; and recording the details of the approval, authorization, and payment in the database.

In a further aspect full "smart" transactions are provided based on the foregoing method.

Systems and methods for practicing the foregoing related developments are provided through this disclosure.

These and/or further aspects, features, and advantages of the present invention will become apparent to those skilled in the art in view of this disclosure.

DETAILED DESCRIPTION

Figure 1:
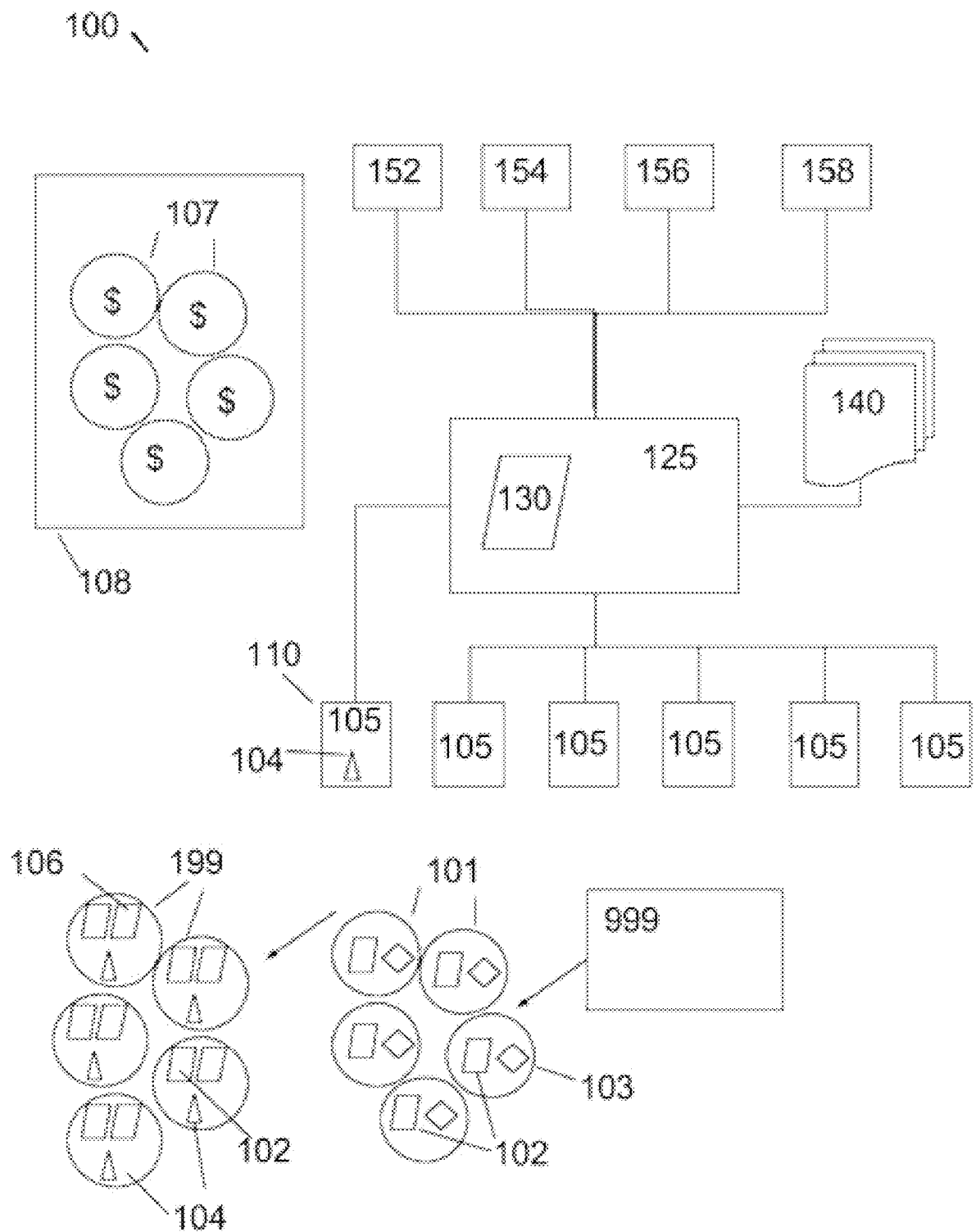
FIG. 1: A diagrammatic overview of an embodiment of a hybrid system featuring a private, permissioned blockchain digital fiat currency (VFM) used in conjunction with real world currencies.

Provided herein are systems and methods for using digital blockchain currencies in conjunction with real world currencies, and a novel digital blockchain currency that can be conveniently incorporated into a new network of financial institutions as well as into an existing structure of central banking authorities and member banks. The systems and methods generally utilize a private permissioned network of financial institutions and utilize a digital blockchain fiat currency that is backed by a real-world currency. The systems and methods provide a wide range of functionality—more functionality than prior digital currencies—through the system, including via the use of e.g. multiple API each of which provides further utility. Smart payments, including payments for invoices, contracts and other request for payments (generally "smart transactions" as defined herein) are also utilized in several of the systems and methods.

Definitions & Abbreviations

Unless expressly defined otherwise, all technical and scientific terms, terms of art, and acronyms used herein have the meanings commonly understood by one of ordinary skill in the art in the field(s) of the invention, or in the field(s) where the term is used. In accordance with this description, the following abbreviations and definitions apply.

Abbreviations

The following abbreviations apply unless indicated otherwise:

ACH automated clearing house;
API application programming interface;
ATM automated teller machine;
CPU central processing unit/processor;
EDI electronic data interchange;
EFT electronic funds transfer;
FI financial institution;
ID identifier; identity;
IoT Internet of Things;
IOU an "I owe you"; i.e. a document acknowledging a debt;
ISO International Organization for Standardization;
JSON JavaScript Object Notation;
NBFI non-bank financial institution (or alternative financial services)
P2P peer-to-peer;
RAM random access memory;
ROM read-only memory;
RWC real world currency;
VBA virtual bank account;
VCA virtual credit account;
VFM virtual fiat money;
VFX virtual foreign exchange account;
WAN wide area network; and
XML extensible markup language

Definitions

"Currency" as used herein means any money that is used as a store of value and medium of exchange in a particular nation, or between nations whether issued as notes or coins. Well-known examples include but are not limited to the following Australian dollar, Brazilian real, British pound Sterling, Canadian dollar, Chinese yuan, European euro, Hong Kong dollar, Indian rupee, Japanese yen, Mexican peso, Russian ruble, Singapore dollar, South African rand, Swiss franc, and the U.S. dollar. In general, currency herein includes money that can be used as legal tender for payments. Currencies may typically be assigned value by fiat or by backing by a particular commodity (e.g. gold, silver, platinum, or other valuable commodity). In certain cases a currency may be specific to a particular merchant or vendor or a group of merchants or vendors (e.g. a group with a commonality such as a geolocation, (e.g. local town 'bucks') or a common industry organization, or the like). Such merchant-specific or merchant-issued 'currencies' may be backed by something of relative value such as goods or services offered by a specific merchant/vendor, or group of merchants/vendors. In other cases, other merchants or vendors may accept such 'currencies' by arrangement with the issuer. Examples might include 'points' issued by credit card companies, or frequent-customer rewards, or even 'cashback' points.

"Fiat" as used herein means 'by agreement or internal rule'. The value of fiat money or currency is typically set via a governmental law, rule, regulation, or decree. The value of such currency can likewise be changed by law, rule, regulation, or decree. Moreover the supply of fiat money can be altered by adjusting the amount in circulation. Such changes can result in inflationary or deflationary effects on economies using the fiat money, and in today's world, those changes are typically carefully managed controlled by central banks established for such purposes. Reliable fiat currencies are guaranteed by the issuer (i.e. the government). Loss of the guarantee, or loss of credit-worthiness of the government, or faith in the ability of the government to back the currency can result in collapse of the currency or hyperinflation. In contrast to fiat money, commodity-based money is backed in whole or part by a commodity whose value is readily determined, e.g. by its price on an open market. The value of commodity currencies can be pegged to the value of the commodity directly or e.g. via a mathematical formula. The value can thus fluctuate along with the market price of the commodity. In a pure commodity money system, any paper money that is in circulation will be fully backed by the commodity and historically paper money was freely exchangeable for e.g. gold (the "gold standard"). A coin in a commodity system is worth the face value on the coin, or has even greater value as the underlying metal from which it is made (e.g. gold or silver). A coin whose face value is not supported at least by the value of the metal from which it is made is fiat money. Thus, hyperinflation is nearly impossible in a gold-backed currency, because the commodity itself has underlying value. For purposes herein, the digital blockchain currency is a fiat electronic currency by virtue of the fact that it's value is linked by mutual agreement to a real-world currency. This currency may be referred to herein as "VFM." In contrast, the real-world currency referenced and represented by the digital blockchain currency may be either a fiat currency or a commodity-backed currency. Thus, any requirement that the digital currency herein be a fiat currency is not dependent on the type or nature of the underlying real-world currency. For the sake of clarity, a digital currency that is created in accordance with the system and methods disclosed herein may still be referred to as a fiat currency or VFM, even if it represents or is backed by a reserve (e.g. a partial or fractional reserve) of commodity or commodity-based currency.

As used herein, the term "blockchain" references any distributed ledger-type database comprising data (generally in blocks) about the file with which the data entries are associated. The database that comprises the blockchain is generally distributed among servers on a network. Here, the blockchain database is distributed among the servers of a private network of financial institutes and/or other parties that are part of the system. Distribution may be by peer-to-peer or other connections that provide access to, or duplication/replication of the database. The databases can be distributed by any means amongst the servers provided that the distributed database is sufficiently secure. Ideally, the method of distributing the databases selected will provide substantial security such that integrity of the database of blockchains is ensured; i.e. such that no party, including the central authority, is capable of modifying the database comprising the blockchains without knowledge of other parties who have true copies of the database. Preferably the servers in the network are updated in real time or near-real time for all changes made at any/from any of the servers. Methods of such distribution are known in the art. As used herein the blockchain records are immutable, as defined below. All changes to the blockchain database constitute new blocks on the blockchain, entries to the database, and are merely appended to the existing chain to effectively create a digital ledger of all changes to the database. The digital ledger is useful in that it provides proof sufficient to audit the history of the file with which the data are associated—from its creation to the moment it is viewed. Certain data in the blockchain are entered automatically—such as the identity of/access credentials for the party modifying the blockchain; and a timestamp indicating e.g. the date and time of any new blocks (i.e. modifications to the database). Other useful security features can include e.g., a digital hashtag to improve security by allowing authenticity to be digitally confirmed.

As used herein, "central authority" means a person, an entity, or a group of entities that has the ability and authority to issue digital currency in connection with the systems and methods disclosed herein. In various embodiments the central authority may be a private entity issuing currency to be used within a private system, such as a private permission-based network. In other embodiments herein, the central authority may be a central bank, or a governmental authority issuing digital currency for a country or a geographic or geopolitical region. A central authority hereunder can also be an entity such as a merchant or a bank or a private network that issues a private 'digital currency' for its customers, or members or the like.

"Monetary policy" (aka "money policy") is any policy implemented by agreement among the permissioned policy or by decree by a central authority (such as a central bank) designed or intended to e.g. ease or tighten money supply, control inflation or deflation, deflate a perceived bubble in any class of assets or investments, stimulate or slow an overall economy or economic system, or the like. Typically, monetary policy for e.g. a country, would be dictated by governmental or quasi-governmental agency or board and implemented via e.g. a central bank.

As used herein, "immutable" means that all prior 'blocks' on the chains (e.g. data entries, records, party IDs, timestamps, and the like) cannot be altered or modified by a party without permission. In general, there is no reason to ever alter or modify a prior block entry and no party is permitted to do so. The database itself can be "modified" by appending new data (e.g. blocks) to the chain. Preferably the blockchain is encrypted (e.g. via a public (or shared/group) key) and can be viewed only by parties with "read" permission, and modified by only parties with "write" permission. In general modifications to the blockchain require a private key that specifically identifies the modifying party. In other words each new block on the chain is appended to the chain by a specific party who has permission to make the modification and the details of the modification (e.g. the time of such modification, the party making the change) are recorded along with the data entered in any newly appended block. Each party that has such a private key is limited with respect to the permissions granted that key. Keys and the permissions that are provided thereby may be revoked or inactivated at any time and the central authority and/or the network of financial institutions generally will establish rules and authority for securely managing keys in the system/network as well as procedures governing revocation of permissions and issued keys.

"Out-of-circulation" refers to the state of an electronic file or token that has been created and includes an intact blockchain, but which has not been placed into circulation in the system. In contrast to out-of-circulation currency, currency is "in-circulation" by a process of 'digital minting' or creation when a participating financial institution that is a bank having permission to do so, modifies the blockchain of an out-of-circulation digital token by appending a new block which assigns, e.g., a real world currency and value to the token. The bank will generally place a corresponding amount of real world currency into an appropriate reserve account to back the digital 'minting' process. "Removal of digital currency from circulation" means removing some portion or all of a given amount of in-circulation digital currency and returning it to out-of-circulation digital currency. The blockchain would of course be modified to indicate the date on which the particular digital currency token was removed from circulation. The removal from circulation may be accompanied by the bank reclaiming or removing any real world currency placed in reserve in connection with the minting of the digital currency being removed from circulation.

As used herein, a "financial institution" means any business that is deemed by the parties to the system to be a financial institution, such as qualified banks (investment banks, commercial banks, savings and loans, and the like), credit loan companies, bill payment companies, money transfer companies, check cashing companies, gift card and stored value account companies, brokerages, investment companies, trusts, investment management companies, insurance companies, foreign exchange companies, credit card companies, and the like. In various embodiments, these financial institutions are duly authorized to operate in accordance with local/national banking laws and other applicable laws where they are located and operating; i.e. they are registered, licensed, or the like as may be required.

As used herein "qualified bank" means a central bank, commercial bank, savings and loan, credit union, or other such bank or organization that can accept deposits from customers and/or which can provide security for those deposits via reserves or guarantees. Preferably, qualified banks as used herein are duly authorized to operate in accordance with local/national banking and other applicable laws where they are located and operating; i.e. they are registered, licensed, or the like as may be required. Preferably qualified banks herein have and satisfy applicable reserve requirements with respect to the deposits that have been entrusted to them. In some cases, qualified banks are distinguished from other financial institutions, which may be described variously as 'non-bank financial services institutions' or 'non-bank financial services' or the like.

"Internet" means the publicly accessible network commonly known as the Internet, including any protocols used for transmitting data packets thereon. A "similar network" means any public, private, or public/private network, whether or not connected to the public Internet, which uses similar principles of operation or architecture, or similar protocols. In particular, networks that are similar to the Internet may involve the transfer of packets of information and use of Internet protocols such as TCP/IP for transmitting data or that comprise multiple nodes capable of communicating with each other, and using Internet protocols or other network protocols for sending and receiving packets of data in a consistent and useful manner even where one or more nodes of the network are unable to communicate), or the like. Preferably such similar networks are global, or regional, or otherwise cover a sufficient geographic area to facilitate both local and remote monitoring and control of industrial systems or sites. Because of the presence of vast infrastructure, use of Internet is economically preferable, however may pose additional security concerns related to the industrial process or setting. In certain embodiments, similar networks that are not readily accessible from the public Internet may be preferred as they offer enhanced security. In other embodiments the communications are encrypted or other security measures are utilized to enable the use of the public Internet.

A "private network" can include any of the features of the Internet, except that it is generally not publicly accessible. Access to private networks can be limited to those who have the correct access point by which to access the network, or it can be limited to those who can produce proper credentials or who can authenticate their access to the network. Such access can be restricted by use e.g. of passwords, access keys, biometrics, and the like, and may include additional steps such as multifactor authentication to ensure security of the private network. Networks may also be structured essentially as hybrids wherein e.g. a portion of the network or a subnetwork or connected network is completely private (i.e. limited to a very specific audience) and another portion (or subnetwork or connected network) is open to a broader audience, or even publicly available.

As used herein, "permission" or "permissioned" mean that a party has an agreed-upon authorization to perform an action with respect the digital blockchain currency (or tokens); i.e. that the parties to the private network have authorized that party to digitally mint in-circulation currency, to modify the blockchain by appending one or more additional blocks thereto, to acquire, redeem, or transact business with the digital blockchain currency. Within the system, there can be multiple levels of permission granted to different parties for different purposes. For example only the central authority can create new out-of-circulation tokens, and only financial institutions that are banks can digitally mint in-circulation currency e.g. within limits and controls set by the central authority. In other circumstances, the central authority may be the only party that can mint in-circulation currency, which it can issue to its banking network for distribution. In some embodiments the central authority handles all clearing and management of reserves over the digital currency. The central authority can both mint and own in-circulation tokens. In one embodiment, banks along with all other financial institutions can view the blockchain data for any electronic token, whether or not they minted it. In another embodiment, only a financial institution with a direct or indirect ownership interest can view the blockchain for a particular token—i.e. they can only view the blockchain if they own (or previously owned) that token, one of their customers owns (or previously owned) it, or it is being presented to them for deposit or payment or the like. Other parties (such as customers, clients, vendors, or merchants) may only to be able to view the blockchain for tokens which they have a specific reason—for example tokens they currently own (e.g. in a virtual bank account). In other embodiments parties can view the blockchain for tokens that are part of a 'smart transaction' (such as an electronic invoice or agreement) in which they have a legitimate interest. Lenders may be able to view tokens in a borrower's account or which reference the borrower in a transaction. In certain embodiments, a prior owner of a token may be able to view the subsequent blockchain of a token under appropriate circumstances.

The value of a given in-circulation digital blockchain token is stated as a number of "physical currency units" of the corresponding real world currency specified for that token. In a preferred embodiment the number of currency units are expressed as the number of "minimal physical currency units" in circulation for that currency. For example, if the corresponding real world currency is U.S. dollars, the minimal physical currency units are pennies, i.e. cents ($0.01). If, for example, the token represented US $1.08 the value would be expressed as 108 (cents). A token representing US $7897.23 would have a value key of 789723 (cents). In another embodiment, a fractional value of the "minimal physical currency units" in circulation can be transacted, such as when micropayments are required. An example of such micro transactions would be a payment for a service or feature in the Internet of Things (IoT).

A "real world currency" is generally a currency that currently exists or previously existed in at least one physical form such as coins or paper money. Real world currencies include both 'traditional' currencies used by any nation, e.g. as legal money, as well as digital currencies that are used as legal money or issued by any central bank or under the authority of any recognized government or the like. The skilled artisan will appreciate that in many modern transactions 'real world' currencies exist primarily as electronic currency—i.e. as represented by an account balance, an electronic transfer or payment of funds, transfers between clearing banks, and such. For purposes herein, currencies that have both a physical and electronic counterparts are 'real world'. In contrast, private cryptocurrencies that are not in common official use by any country, or approved by any government as official currency, nor readily available at commercial banks are generally not 'real world' currencies for purposes herein, even if such currencies are accepted by e.g. some private vendors, merchants, or retailers. Moreover, as some countries are considering doing away with physical currency altogether in favor of digital currency, traditional currencies or real world currencies that do not have or no longer have a physical counterpart can also be 'real world' currencies herein, as well as any after-developed currencies that meet the foregoing definitions. As long as a currency is legal and can be held as reserves, then digital currency in accordance with the present system and methods can represented such currency and/or be backed by such currency.

An "invoice" as used herein broadly means any request or demand for payment of funds to a party making the request or demand from a second party, based on any financial obligation including a contractual obligation e.g. under a contract, smart contract, or other smart transaction. Invoices as used herein are generally generated by e.g. merchants, vendors, suppliers, service providers, licensors, lessors, and the like. The skilled artisan will understand that for convenience herein an 'invoice' can include request for payment in any currency.

As used herein, "transaction" means any financial transaction of any type or nature between two or more parties. Transactions include consumer-to-consumer ("C2C"), consumer-to-business ("C2B"), business-to-consumer ("B2C"), and business-to-business ("B2B"), as well as financial institution-to-financial institution, financial institution-to-consumer, consumer-to-financial institution, financial institution-to-business, and business-to-financial institution transactions. For purposes herein, a business can include a government entity that has financial transactions with consumers, other businesses, other governments, and financial institutions. Transactions hereunder are generally conducted via digital currency, but may include real world currency, combinations of digital and real world currency, or even exchange of goods or services, in part or whole, or in combination with real world or digital currency. Transactions can be conducted by payment by any means including point of sale and online transactions, paying vendors or merchants, collecting accounts receivable, borrowing, lending, foreign exchange, ATM transactions, clearing monetary transactions, and arrangements via 'smart' electronic agreements.

"Smart transactions" hereunder means

"Payment" hereunder means completing a financial transaction or satisfying a financial obligation. In preferred embodiments, payment is made within the system using digital currency. In various embodiments, a payment is made automatically or upon 'authorization' by a party, for example upon approval of an invoice, a smart transaction or the like. It is understood that any party authorizing a payment can make that payment directly or indirectly. I.e. an approving or authorizing party may use e.g. a third party, an agent, or a proxy to make such authorized payments on their behalf. In preferred embodiments, such third party has their own account (e.g. a VBA, VCA, or VFX) within the system from which to make such payments. In other embodiments the third party or agent has adequate permission to make payment directly from the approving or authorizing party's account.

"Dispute resolution" as used herein means any method of resolving disputes in the digital currency system. Typical disputes may include disputes over refunds, or disputed invoices, disputed smart transactions or the like. In various embodiments, the system provides elegant means of resolving such issues based on the relationship of the parties (e.g. consumer to consumer, business to consumer, or business to business) and the terms of any agreement (e.g. refund terms) between these parties. Such dispute resolution within the system may be conducted via peer-to-peer electronic contracts, including data and digital currency value exchange. In various embodiments, smart transactions that specify the details of how disputes are resolved are used between parties. Preferably disputes such as refunds are processed automatically and resolved electronically in accordance with the terms recorded in the smart transaction. In this manner, disputes are not subject to one party refusing to cooperate or comply.

As used herein, "refund" means a request or demand for the return of all or part a payment made for an "invoice", under an agreement between the parties, or under a smart transaction. In cases where the parties of a transaction are unable to cooperate and comply to the refund terms of an agreement, or a smart transaction a third party dispute resolution means of such resolution can be provided to mediate and negotiate such resolution.

A "key" as used herein sometimes refers to e.g. a key within the context of encryption and decryption, such as a public/private key pair. Keys are often required herein for functions such as accessing, encrypting, decrypting, viewing, appending and such with respect to electronic files, blockchains, blocks of data, and the like in the private system such as on networks, or in databases, or data that is passed peer-to-peer or received from another party in the system. "Key" also more generally indicates a means for providing digital access to a file, or a method of authenticating a party and an action taken with in the system or with respect to a blockchain, block, data file, or the like. A key may represent or require a password, or other suitable indicia of permission to a party within the system. Key management includes issuing of permissions, passwords, digital access, and other authentication means (including biometrics). Key management further includes reaffirmation, revocation, reissuance and the like with respect to permissions, keys, passwords, digital access and the like. Key management is important for maintaining the high degree of confidence and trust among the parties in the private financial systems provided herein. Methods for key management in secure systems are known in the art. A "digital signing key" as used herein comprises at least a digital means of ensuring a party's identity and verifying that a file or data entry was created by that party, or that an action taken was in fact taken by that party. The strength of the digital signing keys will correspond directly to the confidence that the key represents the party and that use of the key is an authorized action of the party to whom the key belongs.

As used herein "substantially" may mean an amount that is larger or smaller than a reference item. Preferably substantially larger (or greater) or smaller (or lesser) means by at least about 10% to about 100% or more than the corresponding reference item. More preferably "substantially" in such instances means at least about 20% to about 100%, or more, larger or smaller than the reference item. As the skilled artisan will appreciate the term 'substantially' can also be used as in "substantially all" which mean more than 51%, preferably more than 60%, 67%, 70%, 75%, 80%, 85%, 90%, or more of a referenced item, number, or amount. "Substantially all" can also mean more then 90% including 91, 92, 93, 94, 95, 96, 97, 98, 99 or more percent of the referenced item, number, or amount.

As used herein, the singular form of a word includes the plural, and vice versa, unless the context clearly dictates otherwise. Thus, the references "a", "an", and "the" are generally inclusive of the plurals of the respective terms. For example, reference to "a sensor" or "an industrial process" includes a plurality of such "sensors" or "processes".

The words "comprise", "comprises", and "comprising" are to be interpreted inclusively rather than exclusively. Likewise the terms "include", "including" and "or" should all be construed to be inclusive, unless such a construction is clearly prohibited from the context. Further, forms of the terms "comprising" or "including" are intended to include embodiments encompassed by the phrases "consisting essentially of" and "consisting of". Similarly, the phrase "consisting essentially of" is intended to include embodiments encompassed by the phrase "consisting of".

Where used herein, ranges are provided in shorthand, so as to avoid having to list and describe each and every value within the range. Any appropriate value within the range can be selected, where appropriate, as the upper value, lower value, or the terminus of the range.

The formulations, compositions, methods and/or other advances disclosed here are not limited to particular methodology, protocols, and/or components described herein because, as the skilled artisan will appreciate, they may vary. Further, the terminology used herein is for the purpose of describing particular embodiments only, and is not intended to, and does not, limit the scope of that which is disclosed or claimed.

Although any formulations, compositions, methods, or other means or materials similar or equivalent to those described herein can be used in the practice of the present invention, the preferred formulations, compositions, methods, or other means or materials are described herein.

Any patents, patent applications, publications, technical and/or scholarly articles, and other references cited or referred to herein are in their entirety incorporated herein by reference to the extent permitted under applicable law. Any discussion of those references is intended merely to summarize the assertions made therein. No admission is made that any such patents, patent applications, publications or references are prior art, or that any portion thereof is either relevant or material to the patentability of what is claimed herein. Applicant specifically reserves the right to challenge the accuracy and pertinence of any assertion that such patents, patent applications, publications, and other references are prior art, or are relevant, and/or material.

Detailed Description of Illustrative Embodiments

Systems and methods for utilizing blockchain digital currencies in a private network of financial institutions are provided. Such systems generally feature:

a private network of financial institutions who by agreement participate in the system;

a central authority;

electronic tokens comprising blockchain digital fiat currency;

a reserve of real world currency that backs the blockchain digital currency;

a network of private servers having distributed databases that contain the blockchain data for out-of-circulation electronic tokens, and in-circulation digital token representing currency;

a plurality of customers, consumers, vendors, merchants, lenders, borrowers and the like;

restricted access to permissioned parties where only parties having adequate permission to mint currency, access blockchains, transact business with the blockchain digital currency, redeem the digital currency for real world currency, and the like; and computer modules (such as API's) that provide a large degree of added functionality such as clearing the digital currency for real world currency, and/or exchanging digital currency denominated in one real world currency for digital currency denominated in a different real world currency.

These and other features of the systems and methods will be described in more detail below.

I. Hybrid Currency Systems Providing Private, Permissioned Blockchain Digital Currency and Traditional Real World Currency.

In a first of its several aspects, hybrid currency systems are provided herein. The systems are private, permissioned systems blockchain digital fiat currencies that are established and controlled by agreement of a group of financial institutions who are authorized to 'mint' or circulate electronic representations of real world currency which are useful in a variety of transactions including consumer purchasing, business-to business transactions including paying vendors or merchants and collecting accounts receivable, borrowing, lending, foreign exchange, and arrangements via 'smart' electronic contracts.

The systems thus generally comprise a plurality of electronic tokens representing blockchain digital currency that is out of circulation in the system ("out-of-circulation tokens"), each such token comprising a blockchain including an out-of-circulation block comprising a plurality of the following data:

i) a real world currency ID key;
ii) a null issuing financial institute (FI) key;
iii) a null issue timestamp;
iv) a null party name ID;
v) a null party account ID;
vi) a null party 'transfer to' timestamp; and
vii) a value key wherein the quantity is zero.

The systems also include one or more unique digital security features on each out-of-circulation token to provide security and traceability, and to ensure authenticity for that token such as public key encryption, digital hashtags, and the like.

A plurality of electronic tokens representing blockchain digital fiat currency that is already in circulation in the system ("in-circulation digital currency") is also part of the system. Each in-circulation digital currency token comprises a blockchain that includes the out-of-circulation block and further comprises an appended "in-circulation" block comprising a plurality of the following data:
1) a real world currency ID key;
2) an issuing financial institute (FI) key;
3) an issue timestamp;
4) a party name ID;
5) a party account ID;
6) a party 'transfer to' timestamp; and
7) a value key specifying the value of the token expressed as the number of "minimal physical currency units" in circulation for the corresponding real world currency. As defined herein, for in-circulation currency tokens denominated in U.S. dollars, the minimal physical currency units are based on a penny (i.e. one cent, $0.01).

The systems further comprise a plurality of participating financial institutions including banks and nonbanks. For each participating financial institution that is a qualified bank, the system includes a public/private mint key pair that allows the bank to digitally mint in-circulation digital currency by modifying the blockchain of out-of-circulation tokens by appending an in-circulation block to the existing blockchain. Only holders of valid mint keys can digitally mint in circulation digital currency tokens because of the unique digital security features on the out-of-circulation tokens.

Each bank may mint currency based on behalf of itself (i.e., for its own operations) or on behalf of its customers and clients (i.e. upon request). If the bank mints in-circulation digital currency for itself, it must put up the reserves itself, and will generally hold the newly minted digital currency in one or more virtual 'house' accounts. The tokens for the in-circulation currency will reflect the bank as the proper owner. If a request comes in from a customer or client, the bank may fulfill such request from its own holding of digital currency in accordance with its own rules and relationship with that customer, in which case the blockchain will be modified by appending a block reflecting the transfer to the new owner (i.e. the customer requesting the digital currency). Or the bank may mint new in-circulation currency in accordance with the request. Generally the bank will transfer real-world funds from the customer's or client's real world account in the amount of the digital currency requested and transfer digital currency for the same amount the customer or client's virtual account. In some embodiments, the amount transferred will first settle the request using digital currency transferred from the bank's virtual account to the customer's or client's virtual account, and only mint additional digital currency for the balance of the request. In other embodiments, the bank may mint the digital currency for the entire amount of the request. In such cases, the transferred and newly minted digital currency will include information in the blockchain reflecting the requesting customer/client as the owner. In various embodiments, the financial institutions in the system will utilize a first-in, first-out system to address its minting needs. For example, if a bank is holding in-circulation digital currency for its own use, or has acquired and is holding in-circulation currency minted by other banks during other transactions, the financial institutions will preferably use that in-circulation digital currency to satisfy any demand before minting new digital currency into circulation.

A central authority that creates and issues the out-of-circulation tokens, creates and implements the digital security features for the out-of-circulation tokens, establishes permissions for parties to the system, and issues public/private mint key pairs (for qualified banks) and other public/private decryption key pairs to parties in accordance with their permissions.

The systems also comprise a plurality of private servers comprising non-volatile computer memory storing:
a) one or more distributed databases comprising:
   (i) the out-of-circulation tokens; and
   (ii) the in-circulation digital currency in the system;
b) executable computer code/computer readable instructions sufficient to limit access to the blockchains for out-of-circulation tokens to public/private mint key holders, to allow said key holder to append an in-circulation block to the keychain to digitally mint in-circulation digital currency;
c) executable computer code/computer readable instructions sufficient to allow the blockchains of in-circulation digital currency tokens to only be modified by public/private decryption key holders with sufficient permissions, and to append new blocks to said blockchains;
d) executable computer code/computer readable instructions sufficient to accurately store each blockchain so modified in the databases; and
e) executable computer code/computer readable instructions sufficient to create and store a unique timestamp corresponding to each such blockchain modification; and
2) one or more processors capable of executing the code.

The skilled artisan will appreciate that the servers are functional and thus have all required hardware for their intended purpose whether or not expressly stated (e.g. data buses, ROM, RAM, CPU, and the like).

The system also comprises a network comprising connections between the several private servers including means for distributing the databases between the servers comprising private peer-to-peer connections, or other private permissioned connections, or an electronic portal for accessing said databases; such that the out-of-circulation tokens and the in-circulation digital currency tokens are accessible to the financial institutions having permission. In contrast with presently used cryptocurrencies in general, the out-of-circulation tokens are created (i.e. 'minted') by "fiat" and not mined.

In various embodiments, the participating financial institutions comprise qualified banks and other (nonbank) financial services companies.

In presently preferred embodiments the system further comprising reserved funds in real world currency, which are provided by a qualified bank in proportion to the amount of in-circulation digital currency that is digitally minted by the bank from out-of-circulation tokens. The amount of such reserves can be determined by the initial agreement between the financial institutions, or by the central authority. In one embodiment the total amount of in-circulation digital currency in the system is equal to the total reserved funds in real world currency held by the banks. In other embodiments, the reserves may be a fraction of the in-circulation digital currency (i.e. a fractional reserve system).

It may be noted that one of the features of the present system is that it is entirely trust based. And while reputable financial institutions may tend to trust other reputable financial institutions, the closer a system comes to a full reserve, the easier establishing and maintaining trust between the parties becomes. In a full reserve system, all parties are protected inherently by the reserves.

The system further comprises a plurality of virtual bank accounts (VBAs), virtual credit accounts (VCAs), and virtual foreign exchange accounts (VFXs) in various embodiments. Each such account is associated with a party who is a specific account holder—such as a customer or consumer; a vendor, a merchant, a lender, or a borrower; or any combination thereof. Financial institutions can also have one or more accounts to hold in-circulation digital currency that they have minted for themselves, or which they have come to own. Generally, each account holder has at least one account that is a VBA, a VCA, or a VFX account.

Each account holder can have any number of virtual bank accounts. Such accounts are issued by the financial institutions of the system. For example, preferably an account holder may have separate VBA accounts for each different digital fiat currency that the account holder has with a financial institution in different real world currency. Preferably, the financial institution holds (as deposits) currencies that the financial institutions regularly operate with or utilize. While separate accounts holding digital currency may provide a presently preferred approach, it may be possible in alternative embodiments for an account holder to have a single account that links sub-accounts which hold VFM denominated in different real world currencies, or wherein an account holder can access separate accounts having VFM in different currencies from a single portal or electronic access point to facilitate accessing various currencies in separate accounts.

Each account holder can also optionally have any number of VCAs. As with VBAs, such accounts are issued by the financial institutions of the system. VCA accounts are established with and held by financial institutions that extend lines of credit to third parties. The terms for repayment of such lines of credit are generally agreed upon between the account holders and the financial institution extending the credit, and involve the use of in-circulation digital currency. For example, the account holder may be responsible for periodic payments, e.g. at the end of a billing cycle established by the financial institution. Or the line of credit may be for a specified period of time during which there may be an interest-free period, or interest may accumulate at an agreed-upon rate. Preferably each VCA is denominated in a specific currency that best serves its needs for transactions, billing, and repayment.

Each account holder can also optionally have any number of virtual foreign exchange accounts (VFX). VFX accounts are also issued by the financial institutions. Holders of such VFX accounts can use the VFM funds in their VFX account to transact with merchants, vendors, and other parties that accept payment in the currency of the VFX account where the receiving party's funds deposit into their VBA if the currency is local to them or into their VFX if the currency is foreign. They can also exchange in-circulation digital currency denominated in one real world currency for in-circulation digital currency denominated in any other real world currency. These exchanges are facilitated through a virtual market wherein financial institutions that own in-circulation digital currency denominated in various real world currencies offer to exchange in-circulation digital currency denominated in one real world currency for that denominated in another. The financial institutions can offer exchange rates, which may be comparable to other current FX exchange rates between the two fiat currencies. In other embodiments, the exchange rates may be less because the transaction costs may be kept to a minimum.

In one embodiment, a VFX account can alternatively be setup as a VCA where a financial institution uses its VFM for approved transactions in the currency in which the VFX denominated and then the financial institution bills the VFX account holder in the same currency.

In various embodiments, parties may simultaneously fill multiple roles in the system. For example, a bank may also be a customer of other vendors in the system; a vendor or merchant may also be a borrower, and so on.

In a presently preferred embodiment the holders of virtual bank accounts that are individuals (e.g. customers or consumers) or businesses (e.g. merchants or vendors) are fully compliant with requirements of the financial institutions, including applicable regulatory requirements in the jurisdiction(s) that the financial institution operates. Such requirements may include, for example, identification of the customer or consumer (such as Know Your Customer rules and the like), anti-money laundering requirements, verification of credit worthiness or the like, and/or other applicable regulatory requirements.

A. Expanding the Functionality of the System with Various Modules.

In one embodiment, the functionality of the system can be expanded extensively, e.g. via software modules that interfaces with the system. Generally, one or more of the servers in the private network, or servers connected thereto further comprise modules featuring computer readable instructions for one or more of the following functions:

a) digital minting of in-circulation digital currency from out-of-circulation tokens;
b) acquisition of in-circulation digital currency tokens in exchange for real world currency or traditional electronic funds denominated in real world currency;
c) redemption of in-circulation digital currency in exchange for real world currency or traditional electronic funds denominated in real world currency (with or without subsequent removal of some or all of the in-circulation digital currency from circulation);
d) bank to bank clearing of in-circulation digital currency in exchange for real world currency or traditional electronic funds denominated in real world currency;
e) peer-to-peer payments between any two or more parties in the system;
f) peer-to-peer electronic contracts and data exchange between any two or more parties in the system;
g) vendor invoices (e.g. via peer-to-peer smart transaction data exchange, and payments between parties, e.g. a vendor and one or more other parties in the system);
h) vendor refunds (e.g. via peer-to-peer smart transaction data exchange, and payments between parties, e.g. a vendor and one or more other parties in the system);
i) merchant transactions (e.g. via peer-to-peer smart transaction data exchange, and payments between parties, e.g. a merchant and one or more other parties in the system);
j) merchant refunds (e.g. via peer-to-peer smart transaction data exchange, and payments between a merchant and one or more parties in the system);
k) person to person transfers of in-circulation digital currency, (including but not limited to transfers via peer-to-peer smart transactions with optional "IOU" payback agreement);
l) same party account transfers for transferring in-circulation digital currency;
m) a lending marketplace for matching borrowers and lenders of in-circulation digital currency (including but not limited to such matching comprising peer-to-peer smart transactions, and/or data exchange);
n) a foreign exchange marketplace for exchanging in-circulation digital currency denominated in a first real world currency for in-circulation digital currency denominated in a second real world currency;
o) automated teller machine deposits and withdrawals including "human" as well as machine based ATMs (for example via peer-to-peer smart transactions, data, and/or digital currency value exchanged for real world currency);
p) invoice factoring (for example factoring comprising peer-to-peer smart transactions, data and/or digital currency value exchange);
q) collections of invoices or debts comprising peer-to-peer smart transactions, data, and/or digital currency value exchange;
r) dispute resolution (for example refund disputes); and
s) key management and associated functions.

Because of the inherent security built into the blockchain digital currency tokens, and with the appropriate use of additional security measures (including but not limited to encryption technology, password protection, VPNs, two-part or multipart authentication, biometrics, or the like), one or more of the additional functions can be accessible or provided outside of the private network. In one embodiment, the additional functions may be accessible through a public network, including the public internet.

In a presently preferred embodiment, the foregoing functions are specified and provided via a series of application programming interfaces (APIs). By providing the APIs, the end applications are more easily developed and customized to work within the overall system. Moreover, each API can be tailored to the specific needs and the specific permissioned parties who will have access to the functions provided via any particular API.

With respect to the functions described above, in one embodiment the acquisition of blockchain digital currency comprises direct exchange for real-world currency or electronic funds denominated in units of real world currency for the blockchain digital currency. In one embodiment, such direct exchange comprises internal transfer of real world currency out of the "transfer to" account holder's bank account. In various embodiments, real world currency is transferred via automated clearing house (ACH)/electronic funds transfer (EFT), via cash, check, credit/debit card, or other means of value transfer within the current financial ecosystem.

In a presently preferred embodiment, the acquisition of virtual fiat currency (i.e. blockchain digital currency) from a financial institution by e.g. a customer or client, employs a "first-minted, first utilized" strategy on the part of the financial institution with respect to the mint date of the in-circulation blockchain digital currency. The strategy relies on and is based on the issue date for the particular tokens, i.e. the date the in-circulation currency tokens were minted from out-of-circulation tokens. In particular, the financial institutions always first use the oldest (i.e. the first-minted) of any digital currency tokens presently owned by the financial institution which it did not originally mint into circulation (from out-of-circulation tokens), and then the next oldest, and so on, until the financial institution's supply of in-circulation digital currency is exhausted. If the acquisition exhausts the bank's supply of in-circulation digital currency the bank may then mint new in-circulation digital currency from out-of-circulation tokens in accordance with the procedures for doing so, as described above. The skilled artisan will thus appreciate that the blockchain digital currency can be utilized in a first-minted to most recently minted manner, and finally new currency is minted when needed.

If the financial institution is not a bank, after it exhausts any supply of in-circulation digital currency it presently owns in an oldest to newest fashion, it would then acquire additional in-circulation currency from another source that owns currency, or it will acquire the needed currency from a bank who may mint new currency if needed, consistent with the foregoing. In some embodiments, if a bank exhausts its own supply of in-circulation digital currency, it may also acquire additional in-circulation currency from another party, rather than minting new in-circulation currency from out-of-circulation tokens. For example, in some embodiments, a bank may obtain in-circulation currency from the central authority, such as in a system where the central authority is a central bank that also mints the in-circulation currency from out-of-circulation tokens.

In some cases, the acquisition request may not exhaust a financial institution's supply of in-circulation digital currency, or may total less than the financial institution's supply of in-circulation digital currency, in which the financial institution can effectively "split" a token to allow the precise amount of the request to be met. For example, if a financial institution has 10 in-circulation digital currency tokens in an in-house account, and they are valued at $100 each, they can readily fulfill an acquisition request for, e.g. $800 by transferring the eight oldest (first-minted) tokens to the requestor's virtual account (by appending to the blockchain a block comprising data reflecting the new ownership, date of transfer, and the like). However, if the request is for e.g. $750, the financial institution can transfer the seven oldest in-circulation digital currency tokens (totally $700) to the virtual bank account of the requestor (by appending the appropriate useful data to the blockchain of those tokens). To fulfill the remaining $50 of the request, the financial institution can 'split' or divide the next oldest token into two. In this case the split token's ownership would reflect that $50 of its value is owned by the requestor and is present in the requestor's VBA, while the financial institution would remain the owner of the balance of $50 in the form of a new ("child") token. The appropriate changes would be appended to the blockchain of the relevant tokens and 'child' tokens resulting from split tokens always trace back to the original split token and its minting into circulation. The new child token preferably comprises a blockchain that features the underlying data of the original or parent token—e.g. the same issuing bank, the issue or mint date, etc., and is denominated in the same real world currency. The blockchain of course thus provides a full auditable trail of all transactions, as well as transfers of ownership of those such tokens. The skilled artisan will appreciate that the dividing or splitting of in-circulation digital currency is expected to be a normal part of the process in order for the system to be able to provide for transactions, payments, redemptions, loans, and the like in any amount. Generally there will be at most only a single token that needs to be split in any particular transaction in the system, for example for settlement of a peer-to-peer transaction. In various embodiments, one or more tokens may be 'split' in order to also settle fee shares of each transaction to the parties eligible for such transaction fee shares on transactions applicable to such fees. When transaction level fee sharing is in effect, it is settled with each transaction to all of the applicable fee sharing parties related to a transaction such that these parties need not otherwise bill and settle these fee shares already settled with each transaction.

The present system provides features that allow the blockchain digital currency to conveniently interact with, interconnect with, and harmonize with the existing real-world currency systems. The acquisition, redemption, and/or clearing functions provide such connection. In various embodiments, the blockchain digital currency can be redeemed and/or cleared for physical/real-world currency or electronic funds denominated in units of real world currency. The skilled artisan will appreciate that only in-circulation digital currency can be so redeemed and/or cleared, since out-of-circulation tokens have no value. Moreover, it will be appreciated that each token can only be acquired, redeemed, and/or cleared for the real world currency in which it is denominated. As described herein, foreign exchange functions provide separate useful functionality for exchanging blockchain digital denominated in a first real world currency for blockchain digital currency denominated in a second real world currency.

In various embodiments, redemption can be made for all or part of the value of a particular token for in-circulation currency or group of such tokens. In one embodiment, when a redemption request is made by the owner of particular blockchain digital currency, the redemption is preferably done through the bank (the issuing bank) which minted the largest cumulative value of the digital currency oldest tokens implicated in the redemption request. In other embodiments, the redemption of in-circulation currency may be handled by the bank of a customer of the bank through which the redemption request account is transacted.

If the sum of the values of all in-circulation currency involved in a redemption request exceeds the total of the amount requested in the redemption request, then the most recently issued of these tokens is split in a manner analogous to that described above for acquisition of in-circulation currency. I.e., the financial institution doing the redemption creates a new/child token with a value equal to the amount by which the total of the tokens to be redeemed exceeds the redemption request. The new token ('split token' or 'child token') is issued with same original issuing bank ID and issue date, and is denominated in the same real world currency as the token being split (the parent token). The redeemed portion of the parent token is transferred to the bank or financial institution processing the redemption request along with all of the other older tokens comprised in the redemption request. Preferably, the in-circulation digital currency tokens that were originally minted by the financial institution handling the redemption are converted back into out-of-circulation tokens, and the funds held as reserves for these tokens can be used to honor that portion of the redemption request by paying to the requestor. Tokens for in-circulation currency not originally issued by the redeeming bank or financial institution are now owned by this financial institution and the bank's internal funds equal to this amount are used to fulfill the balance of the redemption request. The redeeming bank or financial institution can subsequently use the remaining in-circulation digital currency for, e.g., acquisition requests, other payment transactions, or may clear all or a portion of that remaining in-circulation digital currency through the bank to bank clearing procedures. In each case, after any redemption or any partial redemption and concomitant splitting of any token, the blockchain of each in-circulation token is appended with a block comprising data sufficiently detailing the transaction, and reflecting any changes in ownership or the like.

In certain embodiments herein, the tokens can further include a parent token 'key' that has a null if the token has not been split from a parent. If a token has been split from a parent the token will reflect the immediate parent.

Clearing of funds between financial institutions (e.g., 'clearing banks') is another important part of modern financial systems. The system herein provides bank to bank clearing of blockchain digital currency in exchange for electronic funds denominated in the corresponding real world currency. Clearing can also be used in various embodiments to exchange current ACH, EFT, check, wire (and other bank-to-bank transactions) for digital currency Such transactions in real world currency are currently cleared through a central bank (such as the Federal Reserve in the US).

Any bank holding an amount of in-circulation digital currency that it did not originally mint/issue, and which it has subsequently funded with its own funds can request to clear all or a portion of the in-circulation digital currency it holds. Clearing transactions, like other transaction in the system are preferably handled on a first-minted, first utilized basis, as discussed above. Thus, the oldest issued (first-minted) tokens are cleared first. Clearing requests are done on a bank-by-bank basis, i.e. clearing of in-circulation currency is performed by the bank that originally minted the in-circulation currency tokens presently held by another bank presenting them for clearance. Requests to each issuing bank may include a bulk request for clearance comprising a plurality of in-circulation digital currency tokens. Each bank is required to promptly settle any in-circulation digital currency that they originally issued, in any amount, when presented for clearing. When the in-circulation tokens are cleared by the minting banks the reserve real world funds held by the clearing bank in connection the digital currency tokens to be cleared is transferred via automated clearing house (ACH)/electronic funds transfer (EFT) to the bank or financial institution requesting the clearance; the in-circulation digital currency are removed from circulation and converted back to out-of-circulation tokens by the clearing bank by appending the appropriate block(s) of data to the tokens.

Peer-to-peer payments and peer-to-peer electronic contracts and data exchange among users of the private system are also functionalities that are provided in the system. The functionalities in various embodiments utilize the first-minted, first out logic for payments and transfers of in-circulation currency. It is to be understood that only 'peers' within the private system are able to participate in such functionality. All peers must have one or more virtual accounts within the system. Any peer making a payment must own, (or have sufficient credit in a virtual credit account for), in-circulation currency in amount at least equal to any amount being paid. The flexibility and extensibility of the system can be maximized through the software, for example using XML or JSON arguments and by allowing additional and optional types of information and data, such as imbedded EDI, ACH, ISO, XML, JSON, or other standard transaction formats, self-describing data formats, and/or other agreed-upon data formats now known or hereafter developed. In various embodiments optional image/document type and attachments are compatible with the system. In one embodiment the data can include scanned documents, images, spreadsheets, and the like. In another embodiment, any text in scanned documents or images can be processed with optical character recognition. In certain embodiments the system is highly mobile-friendly and allows certain data to be readily entered from smart phones, by emailing, sending scans or photographs of documents, images, and the like. The peer-to-peer transactions and related functions comprise a distributed database having blockchain data records regarding all such transactions. The data therein are preferably immutable, and secure. Encryption of sensitive data is provided and access through appropriate keys to parties with permission can be readily implemented. Parties can review detailed audit trails, as well as review financial summaries, net data and the like.

Transactions and functions such as vendor invoices; vendor refunds, merchant transactions, merchant refunds, loans, and person to person transfers (including optional IOUs, reminders of interpersonal debts, notes, private party loans and such) can be handled in the system via peer-to-peer smart transactions, data exchange, and/or payments as provided above.

The system also comprises key and permission management functionality. Keys and permissions in such systems must be carefully maintained by both those able to grant permissions or create keys, and those who are entrusted with them. Keys or other permissions may be lost or stolen, or critical passwords or other means of accessing such keys or permissions may be lost or stolen. Alternatively, the secure status of a key or permission may be questioned because of a security breach in or trespass to physical or electronic systems. In various embodiments, software modules or APIs are included in the system to allow granting, suspending, revoking or reissuing key or permissions. Passwords may be required to be regularly revised or changed. Multi-factor authentication system may be instituted, revised and the like. The end goal of such system is to improve security, and therefore trust in the system.

The skilled artisan will appreciate that the blockchain digital currency of the present system cannot be mined, or otherwise created in any manner by which parties (e.g. banks and other financial institutions) can be compensated. Accordingly, the banks in the present system are not compensated by creating (or "digitally minting") in-circulation digital currency. In one embodiment the financial institutions are instead compensated through transaction, subscription, and/or other banking and financial service fees. It is anticipated that the fees will be low since the costs of transactions in the system is expected to be low. In another embodiment, the financial institutions may otherwise realize value from use of aggregate or specific transaction data. In yet another embodiment, the financial institutions may reap financial benefits from uses of their own customer's data to provide services for the specific benefit of the customer (for which services the customer may also pay a fee).

In one embodiment, the system further comprises one or more "transaction database" that comprises electronic billing and payment systems ('smart transactions') and/or electronic agreements defining transactions between parties in the system. Such transactions and agreements involve the in-circulation digital currency and track the transaction details and provide an audit trail of the transaction and the in-circulation digital currency in connection with such smart transaction(s) or smart contract(s). For convenience, henceforth the term "smart transactions" within the meaning of the present disclosure generally includes agreements that primarily constitute authorizing payments for electronic invoices, bills, contracts, and the like. Smart transactions in various embodiments also include fully executory contracts with obligations initially owed by each party or covenants made by each of the parties thereto. Such smart transactions in either case can track the life of the obligations, including payment obligations. Preferably, the key terms of each merchant and vendor invoice payments include refund terms that can be referenced back should a refund request be disputed.

Preferably the transaction database is stored in the non-volatile memory of the computer and also comprises a distributed database. In certain embodiments the system comprises sufficient network connections to provide access to the transaction database to the parties of the electronic contracts. Generally, only parties to the smart transactions have access permission to access a particular electronic contract, unless, e.g., another party receives permission from a party to the contract. Smart transactions are described more fully in Section III below.

The foregoing systems can be better understood with reference to the figures. FIG. 1 shows an overview of an embodiment of a hybrid system in accordance herewith. As can be seen, the central authority 999 has the sole authority to create out-of-circulation tokens 101. The out-of-circulation tokens 101 comprising a blockchain 102 are only accessible by the financial institutions 105 that are qualified banks 110. A qualified bank 110 wanting to put digital currency into circulation for its own needs or to fulfill a request from a customer can place an amount of real world currency 107 in a reserve deposit 108. The bank 110 can verify that the out-of-circulation token 101 is authentic via a digital security means 103 such as a hashtag or the like, and can use its digital minting key 104 to digitally mint in-circulation digital currency 199 in proportion to the amount of real world currency 107 placed in the reserve deposit 108 by appending an in-circulation block 106 to the blockchain 102.

System 100 is a hybrid currency system featuring both private permissioned digital fiat currency and traditional real world currency. The system features network 125 comprising a plurality of servers (not shown) with connections to each of the financial institutions 105 and a distributed database 130. A group of software modules 140 can provide many additional functions such as minting, acquisition, redemption, clearing, foreign exchange services, credit and lending services, automated teller access functions, peer-to-peer transactions, token splitting functions, key management, and more.

The system further comprises a plurality of customers 152, consumers 154, vendors 156, merchants 158—each of whom hold accounts 160 in the system 100. The private network and the database are only accessible to such parties with permission. Various parties within the system may have different levels of permission for different functions and uses of the in-circulation digital currency 199.

II. Method of Implementing and Using a Private, Permissioned Blockchain Digital Fiat Currency.

In a second of its several aspects, this disclosure provides methods for implementing and using a private permissioned blockchain digital fiat currency. The methods generally involve establishing a central authority to issue a plurality of electronic tokens representing blockchain digital currency that is out of circulation in the system ("out-of-circulation tokens"). The out-of-circulation tokens have zero value, and each token comprises a blockchain that initially includes an "out-of-circulation" block comprising a plurality of the following data:
 i) a real world currency ID key;
 ii) a null issuing financial institute (FI) key;
 iii) a null issue timestamp;
 iv) a null party name ID;
 v) a null party account ID;
 vi) a null party 'transfer to' timestamp; and
 vii) a value key wherein the quantity is zero;

The out-of-circulation tokens include unique digital security feature(s) generated by the central authority on each out-of-circulation token to ensure security, traceability, and authenticity for that token. The tokens can be encrypted with public keys such that only qualified banks can access the out-of-circulation tokens. Digital signatures, digital fingerprints, hashtags or the like can be used to ensure authenticity.

The methods comprise recruiting or getting a plurality of financial institutions to become parties by mutual agreement to a private permissioned network in connection with the digital fiat currency. The central authority establishes unique permissions for each of the financial institutions to identify each such financial institution in the system.

For each participating financial institution that is a qualified bank (as determined, e.g., by agreement), the central authority generates a unique public/private mint key pair that allows the bank to digitally mint in-circulation digital currency by modifying the blockchain of out-of-circulation tokens by appending an in-circulation block on to the blockchain, notwithstanding the unique digital security features on the out-of-circulation tokens. The skilled artisan will appreciate that the central authority may use a single public group key that will enable each of the banks to use their own private key to digitally mint currency as set forth herein. Thus while each bank must have a unique private key for decrypting, and a public key for signing or authenticating documents signed by the bank, the central authority may have a public group key that can encrypt the tokens in a manner that only financial institutions that are banks can decrypt the blockchain and append data to it in the manner required to mint in-circulation currency from out-of-circulation tokens.

The methods further comprise the step of providing a plurality of private servers. Each server comprises
1) non-volatile computer memory storing:
  i) one or more distributed databases comprising:
    a) the out-of-circulation tokens; and
    b) the in-circulation digital currency in the system;
  ii) executable computer code/computer readable instructions sufficient to limit access to the blockchains for out-of-circulation tokens to public/private mint key holders, to allow said key holder to append an in-circulation block to the keychain to digitally mint in-circulation digital currency;
  iii) executable computer code/computer readable instructions sufficient to allow the blockchains of in-circulation digital currency tokens to only be modified by public/private decryption key holders with sufficient permissions, and to append new blocks to said blockchains;
  iv) executable computer code/computer readable instructions sufficient to accurately store each blockchain so modified in the databases;
  v) executable computer code/computer readable instructions sufficient to create and store a unique timestamp corresponding to each such blockchain modification; and
2) one or more processors capable of executing the code; and A network is established among the private servers, and connections are created between the private servers on the network. The network includes means for distributing the databases between the servers. The connections can comprise private peer-to-peer connections, or other private permissioned connections. In some embodiments the servers provide an electronic portal for accessing the databases. Out-of-circulation tokens are accessible only to the financial institutions (e.g. qualified banks) having permission to access those tokens. In-circulation digital currency tokens are initially accessible only to the financial institutions having permission to access those tokens.

For each bank electing to digitally mint an amount of in-circulation digital currency, the bank undertakes the steps of:
1) reserving funds in proportion to the amount of in-circulation digital currency the bank elects to digitally mint;
2) digitally minting the amount of in-circulation digital currency by modifying the blockchain for one or more out-of-circulation tokens by appending thereto an "in-circulation" block comprising a plurality of the following data:
  i) a real world currency ID key;
  ii) an issuing financial institute (FI) key;
  iii) an issue timestamp;
  iv) a party name ID;
  v) a party account ID;
  vi) a party 'transfer to' timestamp; and
  vii) a value key specifying the value of the token expressed as the number of "minimal physical currency units" in circulation for the corresponding real world currency; and
3) repeating steps i(1) through i(2) each time the bank elects to digitally mint an amount of in-circulation digital currency;

After out-of-circulation tokens are created and in-circulation digital currency has been digitally minted, the method involves allowing a party that is a financial institution, customer, consumer, vendor, merchant with permission to use the in-circulation currency in one or more transactions in the private system.

In each instance, the method, being blockchain-based, comprises faithfully/accurately recording the details of the transactions in one or more blocks appended to the blockchain, providing timestamps and ensuring the integrity of the blockchains.

The methods allow a private network of financial institutions together with a central authority, such as a central bank, to issue, utilize, and control a blockchain digital fiat currency that works seamlessly in conjunction with a real world currency, and which can be readily redeemed or otherwise exchanged for real world currency, or which can be used for electronic transactions and electronic contracts of all types including sales, purchases, lending, foreign exchange and more. In combination with blockchain digital currency and the electronic smart transactions provided herein, the methods comprise a powerful method that allows financial institutions to benefit from many of the advantages of blockchain digital currencies while avoiding the pitfalls. The method is trust-based and permission-based such that specific parties have specific roles, and specific privileges within the private network.

The participating financial institutions in the private network generally comprise banks and nonbank financial services companies. In a presently preferred embodiment, the methods involve a full reserve of real world currency, i.e. the total amount of in-circulation currency in the system is equal to the total reserved funds held by the banks.

In practice the method preferably further comprises a step wherein account holders establishing one or more virtual bank accounts, virtual credit accounts, or virtual foreign exchange accounts at one or more of the financial institutions. Each such account is associated with a specific account holder that is a customer or consumer, a vendor, a merchant, a lender, or a borrower; or any combination of the foregoing. Each account holder thus has at least one account that is a virtual bank account, a virtual credit account, or a virtual foreign exchange account. Each customer or consumer has at least one virtual bank account.

The roles described above for account holders are not mutually exclusive and as described above, an account holder can often have different roles and different accounts of one or more types.

The method further comprises documenting or verifying the identity of the holders of virtual bank accounts that are individuals (e.g. customers or consumers) or businesses (e.g. merchants or vendors) and preferably ensuring they are fully compliant with the regulatory requirements of the financial institution establishing the account.

In a presently preferred embodiment the method further comprising the step of providing computer readable instructions stored in the non-volatile memory for one or more of the following functions:
  a) digital minting of in-circulation digital currency from out-of-circulation tokens;
  b) acquisition of in-circulation digital currency tokens in exchange for real world currency or traditional electronic funds denominated in real world currency;
  c) redemption of in-circulation digital currency in exchange for real world currency or traditional electronic funds denominated in real world currency (with or without subsequent removal of or some or all of the in-circulation digital currency from circulation);
  d) bank to bank clearing of in-circulation digital currency in exchange for real world currency or traditional electronic funds denominated in real world currency (with or without subsequent removal of or some or all of the in-circulation digital currency from circulation);
  e) peer-to-peer payments between any two or more parties in the system;
  f) peer-to-peer electronic contracts and data exchange between any two or more parties in the system;
  g) vendor invoices via peer-to-peer smart transactions data exchange, and payments between a vendor and one or more parties in the system;
  h) vendor refunds via peer-to-peer smart transactions data exchange, and payments between a vendor and one or more parties in the system;
  i) merchant transactions via peer-to-peer smart transactions data exchange, and payments between a merchant and one or more parties in the system;
  j) merchant refunds via peer-to-peer smart transactions data exchange, and payments between a merchant and one or more parties in the system;
  k) person to person transfers of in-circulation digital currency (for example via peer-to-peer smart transactions with optional "IOU" payback agreement);
  l) same party account transfers for transferring in-circulation digital currency;
  m) a lending marketplace for matching borrowers and lenders of in-circulation digital currency via peer-to-peer smart contracts and data exchange;
  n) a foreign exchange marketplace for exchanging in-circulation digital currency denominated in a first real world currency for in-circulation digital currency denominated in a second real world currency;
  o) automated teller machine deposits and withdrawals (including "human" as well as machine based ATMs via peer-to-peer smart transactions data, and digital currency value exchanged for real world currency);
  p) invoice factoring (e.g. via peer-to-peer smart contracts, data, and digital currency value exchange);
  q) collections of vendor invoices or debts via peer-to-peer smart contracts, data, and digital currency value exchange; and
  r) dispute resolution.

In preferred embodiments, the foregoing functionalities are provided through one or more software modules, APIs, or the like providing useful additional functionalities to the system and designed to allow the functionality to be easily implemented into e.g. applications to be used by various parties, in accordance with their permissions.

In various embodiments, the methods further comprising the step of compensating the financial institutions through transaction, subscription, and other banking and financial services fees. Because the blockchain digital currency is created by fiat and not mined, it is not possible for financial institutions to be compensated through fees for mining or creating the digital tokens representing in-circulation currency. In another embodiment, the financial institutions may otherwise realize value from anonymous use of their customer transaction data and/or in uses of customer's data for the specific benefit of the customer for which the customer may also pay a fee to utilize.

In one embodiment, the one or more distributed databases further comprise a transaction database that comprises electronic transactions or contracts defining transactions between parties involving the in-circulation currency and which track the transaction details and provide an audit trail of the transaction and the in-circulation currency in connection therewith.

In one embodiment, the step of creating connections between the private servers on the network further comprises creating sufficient network connections to provide access to the transaction database to the parties to the electronic contracts. Access to such transaction is preferably limited to the parties who are directly involved in the transactions or contracts.

Public/private key pairs can be used to control access to the contents of the electronic contracts or transactions and to provide a measure of digital security. In other embodiments, the one or more unique digital security features involve a public key encryption step that requires a private key to decrypt said features and access the blockchain for the tokens used to settle the electronic contract or transaction. Other means for securing the digital currency tokens are contemplated for use herein. The use of such digital security features is known in the art. In various embodiments, such additional security measures are included to provide a high level of security and confidence among the parties using the systems and methods in connection with digital currency, and particularly the financial institutions as disclosed herein.

Figure 2:
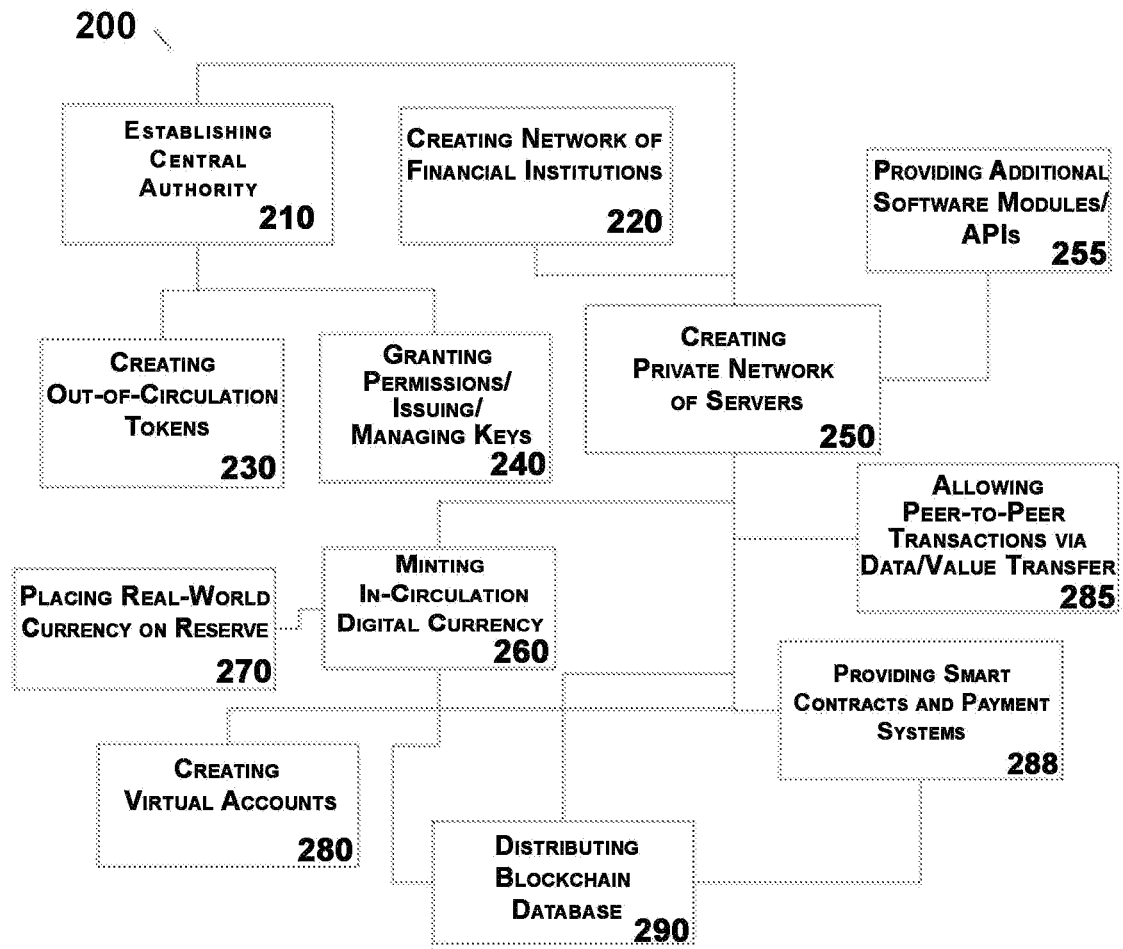
FIG. 2: A flowchart showing the steps of an embodiment of the method of implementing and using a private permissioned blockchain digital fiat currency.

FIG. 2 shows a flowchart of an embodiment 200 of the general method described above. As the skilled artisan will recognize, the methods involve the interconnections of many aspects of a complex system and thus the order of the steps of this and any method disclosed herein can generally be altered except where one step reasonably requires a predicate or a prior step to be carried out first. Unless the order of steps is strictly required, they steps and relationships depicted or exemplified should not be deemed to be presented in any particular order of preference but can be varied where useful. Similarly, except where apparent from the context of the step, the brief terminology or short description for the various steps is intended to be general and not limiting.

As can be seen, method 200 comprises a unique approach to utilizing digital blockchain currency in conjunction with real world currency. In the methods generally, a central authority is established 210. The central authority is useful herein because the blockchain digital currency of the instant invention is not mined or discovered, but is created by fiat for use by a private network of financial institutions. The network of financial institutions is created (creating step 220). The central authority undertakes the step 230 of creating electronic tokens representing out-of-circulation currency. The central authority, in conjunction with the network of financial institutions next exercises its authority in granting permissions and issuing/managing keys 240 to financial institutions based on, e.g. their role in the private network. For example, the financial institutions that are qualified banks are generally the only financial institutions that have adequate permission to mint in-circulation digital currency from out-of-circulation tokens. Creating a private network (step 250) allows the financial institutions that are banks with permission to access the out-of-circulation tokens created by the central authority. The private network enables providing additional software modules, APIs, or the like to vastly enhance the functionality of the system and the overall application of the methods provided herein.

After the network is established, each financial institution that is a qualified bank, using its dedicated, unique keys, can undertake the step of minting (step 260) in-circulation currency from the out-of-circulation tokens. In order to practice the minting step, a qualified bank must also place real world currency on reserve (step 270), in accordance with the requirements of the network of financial institutions. In a preferred embodiment, there is a 100% reserve requirement. In other embodiments, the reserve requirement may be fractional, i.e. real world reserves may be required for only a portion of the in-circulation digital currency.

When in-circulation digital currency is created, the blockchain of each individual token is appended with one or more data blocks that identify the details of that in-circulation digital currency including at least the unique ID of the bank that created or minted that currency, the value in the corresponding real world currency, and the date and time of minting (i.e. a timestamp). The blockchain is immutable and recorded in a database that is distributed in step 290 via the network to parties that have adequate permission to view the data. The data may be distributed peer-to-peer or via other means as is most useful. The advantages of using peer-to-peer distribution of such data are known in the art.

The in-circulation digital currency may be useful in transactions between banks. However, to maximize the use and application of the methods a plurality of virtual accounts (including for example virtual bank accounts, virtual credit accounts, and virtual foreign exchange accounts) are created in step 280 for a plurality of banks customers, consumers, vendors, merchants and other members (including financial services companies, lenders, foreign exchange companies, and the like). Each of the foregoing parties to the system have at least one such virtual account and each account is connected to the server network directly or via one or more banks or nonbank financial services institutions.

In presently preferred embodiments of the methods, the steps of allowing peer-to-peer transactions (step 285) and providing electronic payment systems and electronic smart transactions and smart contracts (step 288) are included. Preferable such steps include allowing peer-to-peer transfer of value via the in-circulation digital currency, in addition to peer-to-peer data transfer.

Figure 4:
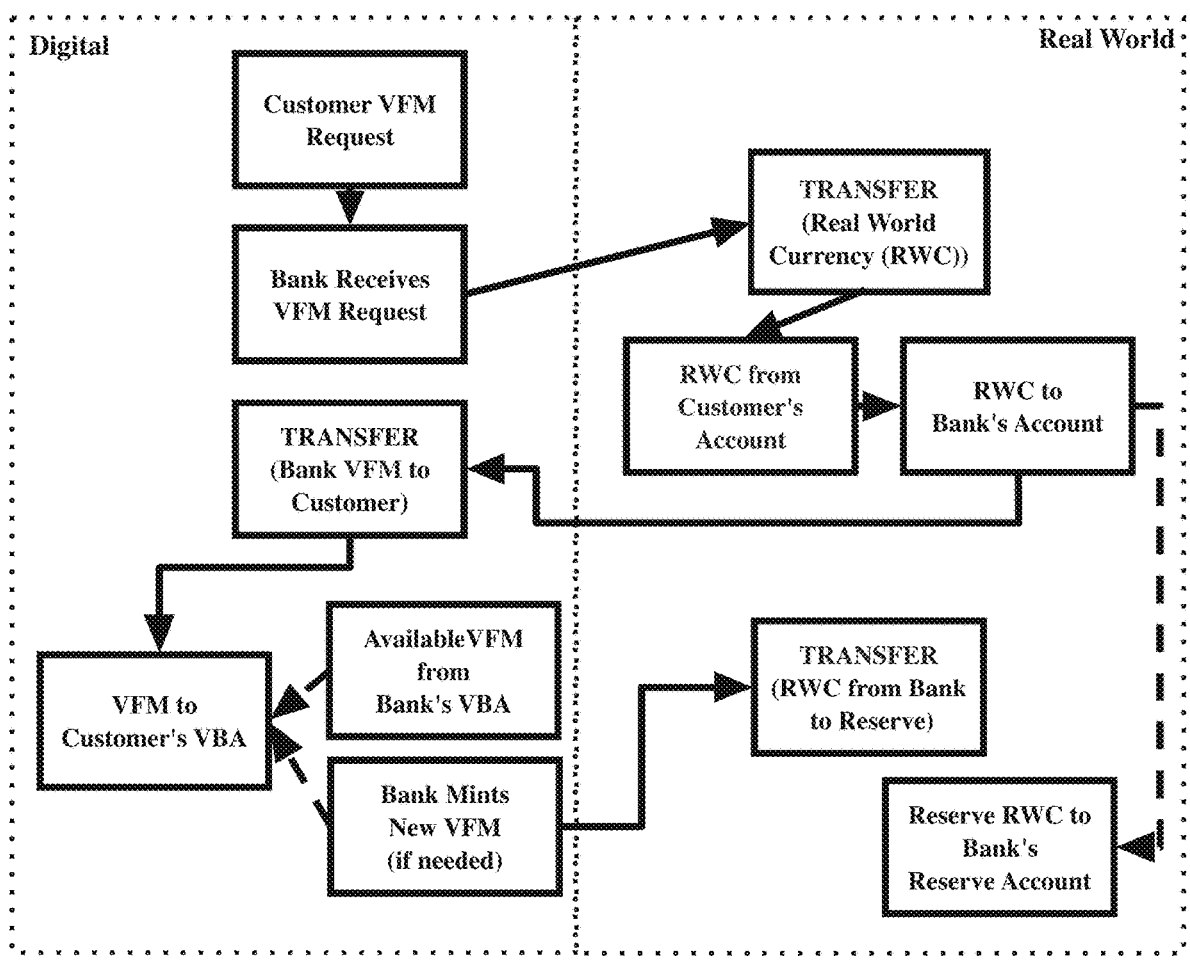
FIG. 4: A flowchart showing an embodiment of how a financial institution here fills a customer request for virtual fiat money in the system.

With further reference to the figures, FIG. 4 depicts an embodiment 400 showing aspects of the acquisition of the VFM by banks, e.g. in response to a request from a customer. As can be seen, aspects of the system occur solely in the digital world and involve virtual bank accounts and virtual fiat money while other aspects occur in the real world and involve normal bank accounts and real world currency ('RWC'). As can be seen a typical process is initiated by a customer request 410 which is received by a bank FI 420. A first transfer 430 occurs during which RWC from the customer's bank account 440 is transferred to the bank for such purposes (e.g. in a house account or the like). Thus RWC is transferred to an account 450 at the bank in an analogous manner to how a customer would pay for e.g. a cashier's check, foreign currency, or the like. A second transfer 460 then occurs during which VFM is transferred/deposited in the customer's VBA 470. The transfer 460 can comprise two components. The bank will first use VFM 480 it already owns in its own internal accounts (whether or not the bank previously minted the VFM or whether the bank has accepted/received the VFM in a transaction or during the normal course of business. If the bank is not holding sufficient existing VFM, the bank can mint such additional VFM 490 as desired or e.g. needed to complete the current request. If the bank does not mint any new VFM 490, the customer's request is filled and the process is complete. If the bank does in fact mint new VFM from out-of-circulation tokens to in-circulation tokens, a third transfer 495 is required. In this situation, the bank must transfer RWC from its account 450 in an amount sufficient to satisfy the reserve requirement of the central authority/system for the amount of new VFM it minted. The funds are held in the bank's reserve account 498, the funds are which are not available until such time as VFM is cleared from the system. The reserves in account 498 are constantly adjusted as needed to ensure the reserve requirements are met as VFM is minted into the system by the bank, and cleared out of the system by the bank. To improve the functionality of the acquisition of VFM, any number of API's can be provided to facilitate the various steps for the customer or the bank. Examples of such API's would include functions for requesting or approving the request for VFM by a customer.

Figure 5:
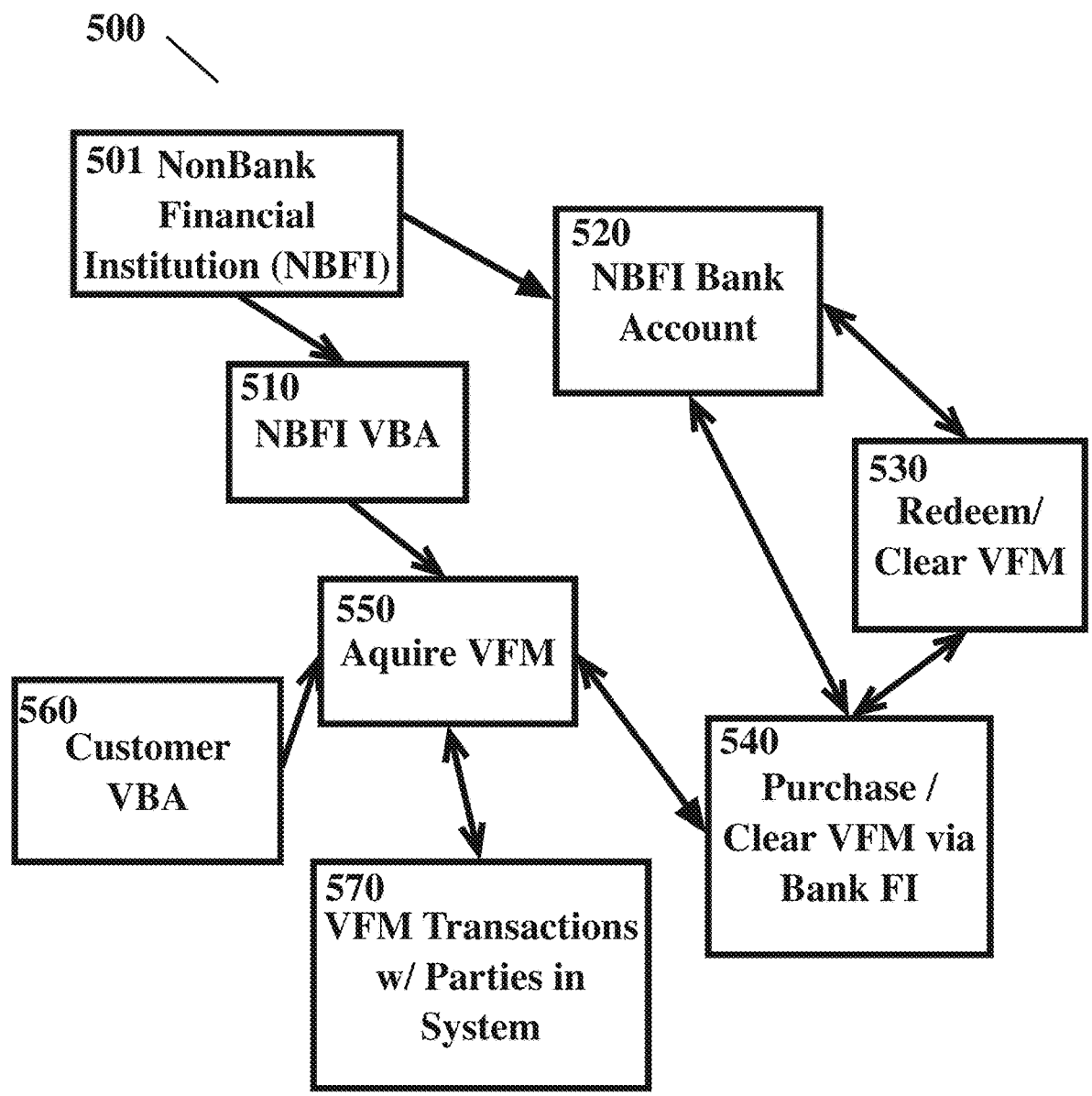
FIG. 5: A flowchart showing aspects of how an alternative financial services business (or nonbank financial institution) in the system that cannot directly mint in-circulation VFM can nonetheless establish a VBA and acquire VFM in the system, and transact business using VFM.

FIG. 5 depicts aspects of VFM acquisition (and redemption) by a non-bank financial institution ("NBFI). Generally the system is established with central authority and/or financial institutions that are qualified banks as the only parties with permission to mint out-of-circulation currency to in-circulation currency. However, alternative financial services companies that are not banks still participate extensively in the system. Accordingly, as shown in embodiment 500 in FIG. 5, a NBFI 501 having a VBA 510 in system and a regular bank account 520 can acquire VFM in several ways. After the VBA 510 is established, the NBFI 501 can purchase VFM from a financial institution that is a bank, e.g. in the manner as described above for a customer in FIG. 4. Thus a purchase of VFM 540 can be made using RWC from the bank account 520. Purchased VFM will be transferred/deposited in the NBFI VBA 510 as described above. Other methods that the NBFI can acquire VFM 550 include from its own customers (who would pay the NBFI 501 from the customer's VBA 560. The NBFI 501 can also acquire VFM 550 through other VFM-based transactions with other parties in the system having VFM (and in a VBA or other account in the system). The financial institution that is bank can also clear or redeem VFM 530 for the NBFI 510. When any portion of the NBFI's VFM is cleared through a bank FI 540, the proceeds can be deposited in the NBFI bank account 520, and any VFM acquired 550 (e.g. purchased from the bank can be deposited into the NBFI VBA 510). This, while the NVFI may not have as complete permissions as a financial institution that is a bank, it can still participate extensively in the system and reap many of the advantages the VFM system provides. As in FIG. 4, the steps and processes involved for the NBFI can be facilitated by the use of appropriate API's in the system.

Figure 6:
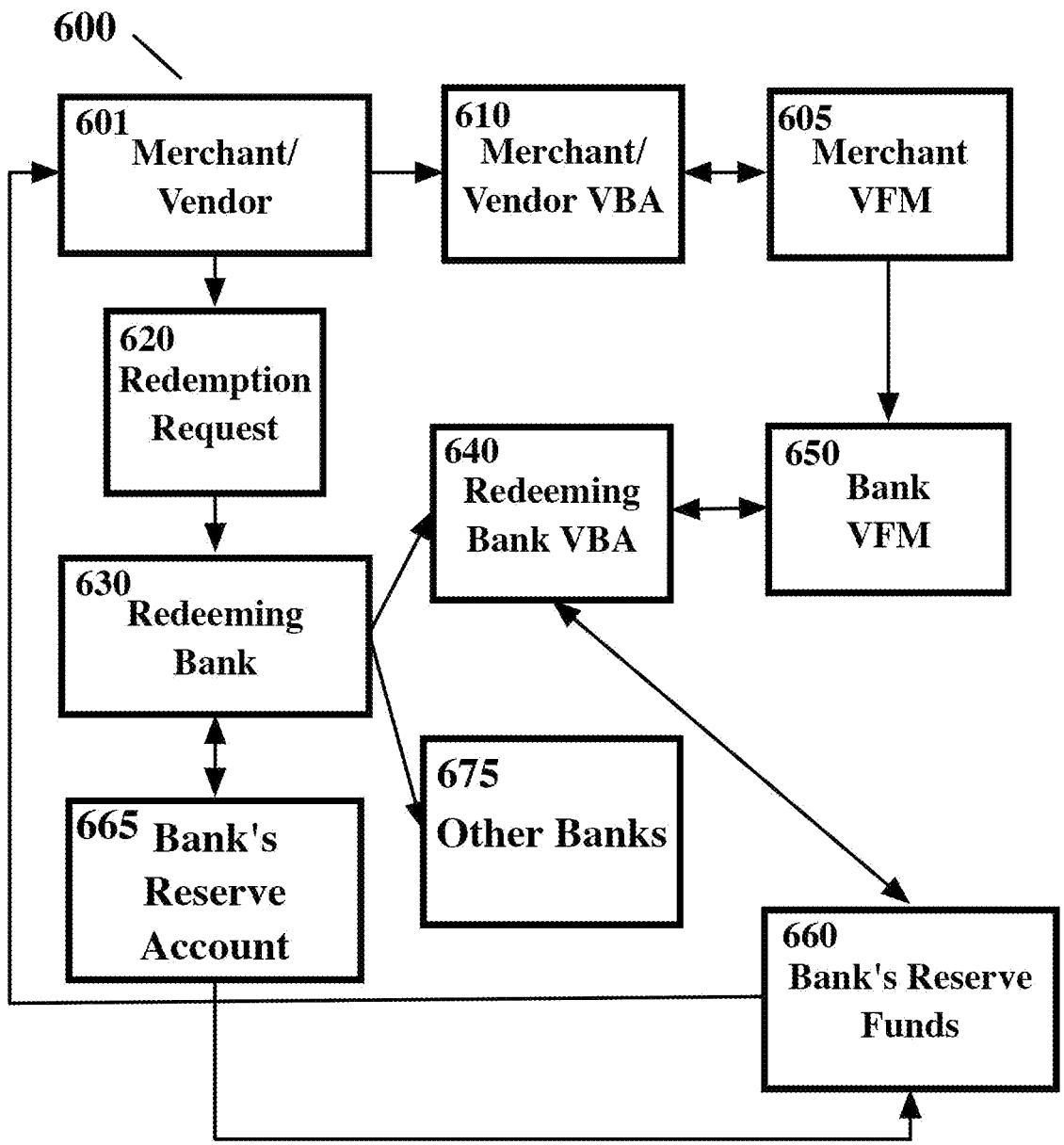
FIG. 6: A flowchart showing aspects of VFM redemption for non-financial institutions (e.g. vendors and merchants) within the system.

FIG. 6 provides a flowchart of an embodiment 600 showing aspects of VFM redemption for non-financial institutions (e.g. vendors and merchants) within the system. A merchant or vendor 601, having a merchant/vendor VBA (virtual bank account) 610 requests redemption of all or any portion of the VFM 605 in the VBA 610. The redemption request 620 can be conveniently facilitated through a redemption API (not shown) and other API functionality throughout the process. Financial institutions that are banks receive the redemption request 620. A redeeming bank 630 is selected. On an embodiment where redemption is on a first minted/first redeemed (i.e. first in/first out) basis, the redeeming bank 630 is e.g. the bank that minted majority of the oldest VFM 605 to which the request is applicable. Using processes such as ACH and EFT, the redeeming bank 630 transfer funds in the appropriate real world currency to the vendor/merchant's 'real world' bank account, in exchange for VFM 605. The redeeming bank 630 receives the VFM 605 into its own VBA 640 as VFM 650 and can handle it as follow: VFM 650 can be (re)circulated throughout the system. Or, for that portion of VFM 650 originally minted by the redeeming bank 630, the redeeming bank can clear the VFM 650 by taking it from in-circulation and returning it to out-of-circulation, and simultaneously recovering the redeeming bank's 630 reserve funds 660 from the bank's restricted reserve account 665. The remaining VFM 650 originally minted by other bank FI's 675 can be (re)circulated or can be redeemed and cleared through the bank(s) 675 that originally minted the VFM 650, with each bank 675 responsible for redeeming and/or clearing the VFM 650 that it originally minted in the same manner as redeeming bank 630 redeemed the VFM 650 it originally minted.

Figure 7:
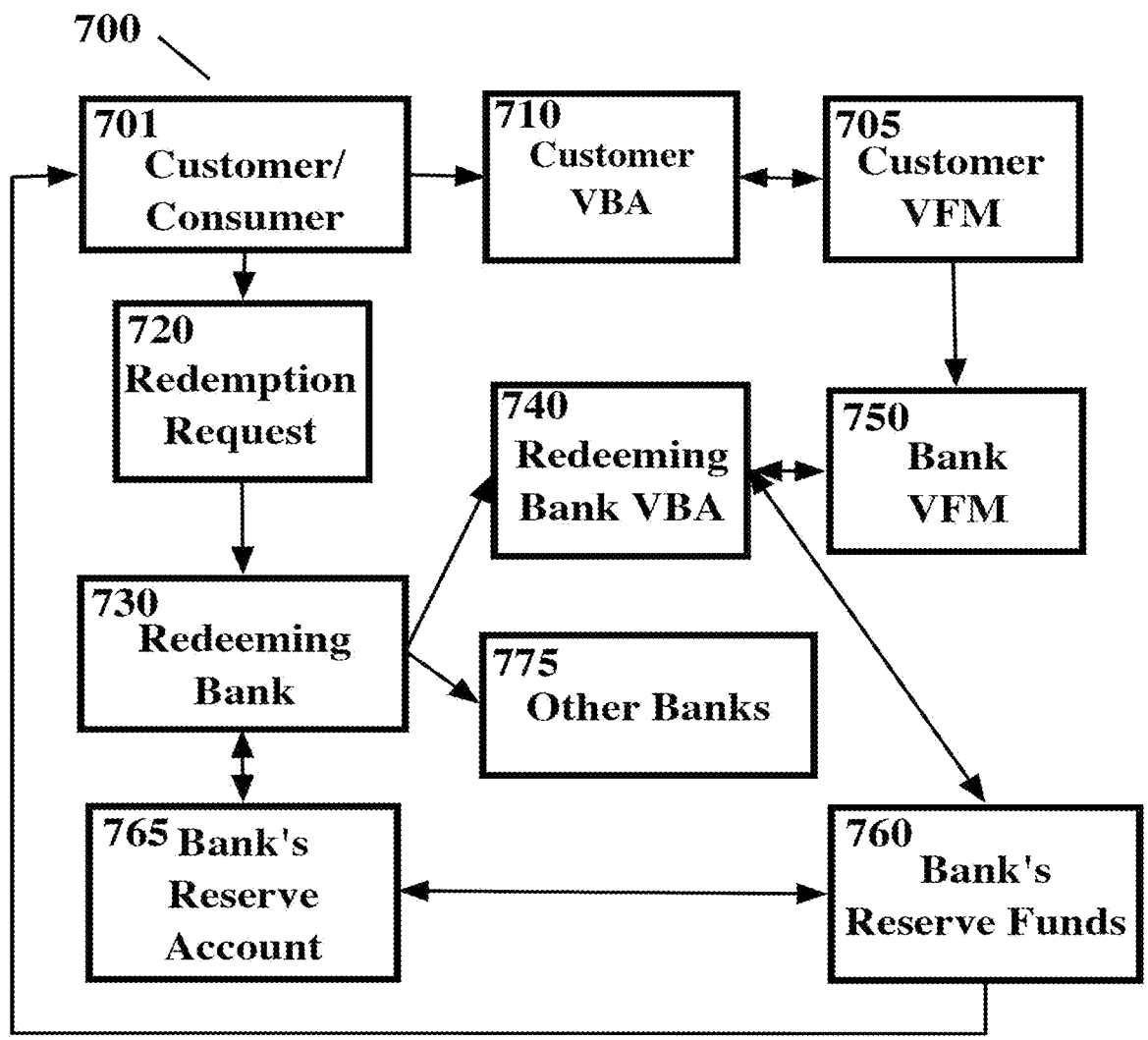
FIG. 7: A flowchart showing aspects of VFM redemption for e.g. customers and consumers with in the system.

FIG. 7 provides a flowchart of an embodiment 700 showing aspects of VFM redemption for individuals, customers, and consumers within the system. A customer or consumer 701, having a VBA (virtual bank account) 710 requests redemption of all or any portion of the VFM 705 in the VBA 710. As with merchants and vendors shown in FIG. 6, the redemption request 720 can be conveniently facilitated through a redemption API (not shown) and other API functionality throughout the process. One noticeable difference is that a customer or consumer makes the redemption request 720 directly to the customer's or consumer's own bank 730 with whom the customer or consumer has its VBA 710. The redeeming bank 730 is thus selected by the fact of being the customer's or consumer's banking FI in the system. Unlike in the situation with merchants and vendors, the process is basically internal to the customer's or consumer's bank 730 and thus does not require or utilize ACH. The redeeming bank 730 transfer funds in the appropriate real world currency to the customer's/consumer's 'real world' bank account, in exchange for VFM 705. The customer's/consumer's bank (i.e. the redeeming bank) 730 receives the VFM 705 into its own VBA 740 as VFM 750. As above, the redeeming bank 730 now owns VFM 750 and can handle it as follow: VFM 750 can be (re)circulated throughout the system. Or, for that portion of VFM 750 originally minted by the redeeming bank 730, the redeeming bank 730 can clear the VFM 750 by taking it from in-circulation and returning it to out-of-circulation, and simultaneously recovering the redeeming bank's 730 reserve funds 760 from the bank's restricted reserve account 765. The remaining VFM 750 originally minted by other bank FI's 775 can also be handled as above. I.e. VFM 750 not originally minted by the bank can be (re)circulated or can be redeemed and cleared through the bank(s) 775 that originally minted the VFM 750, with each bank 775 responsible for redeeming and/or clearing the VFM 750 that it originally minted in the same manner as redeeming bank 730 redeemed the VFM 750 it originally minted. For merchants and vendors the redeeming bank 630 is determined based on FI/FO principles and the amount each bank originally minted. For individuals (e.g. customers, consumers, non-business accounts) each bank 730 redeems VFM for its own customers or consumers.

Figure 8:
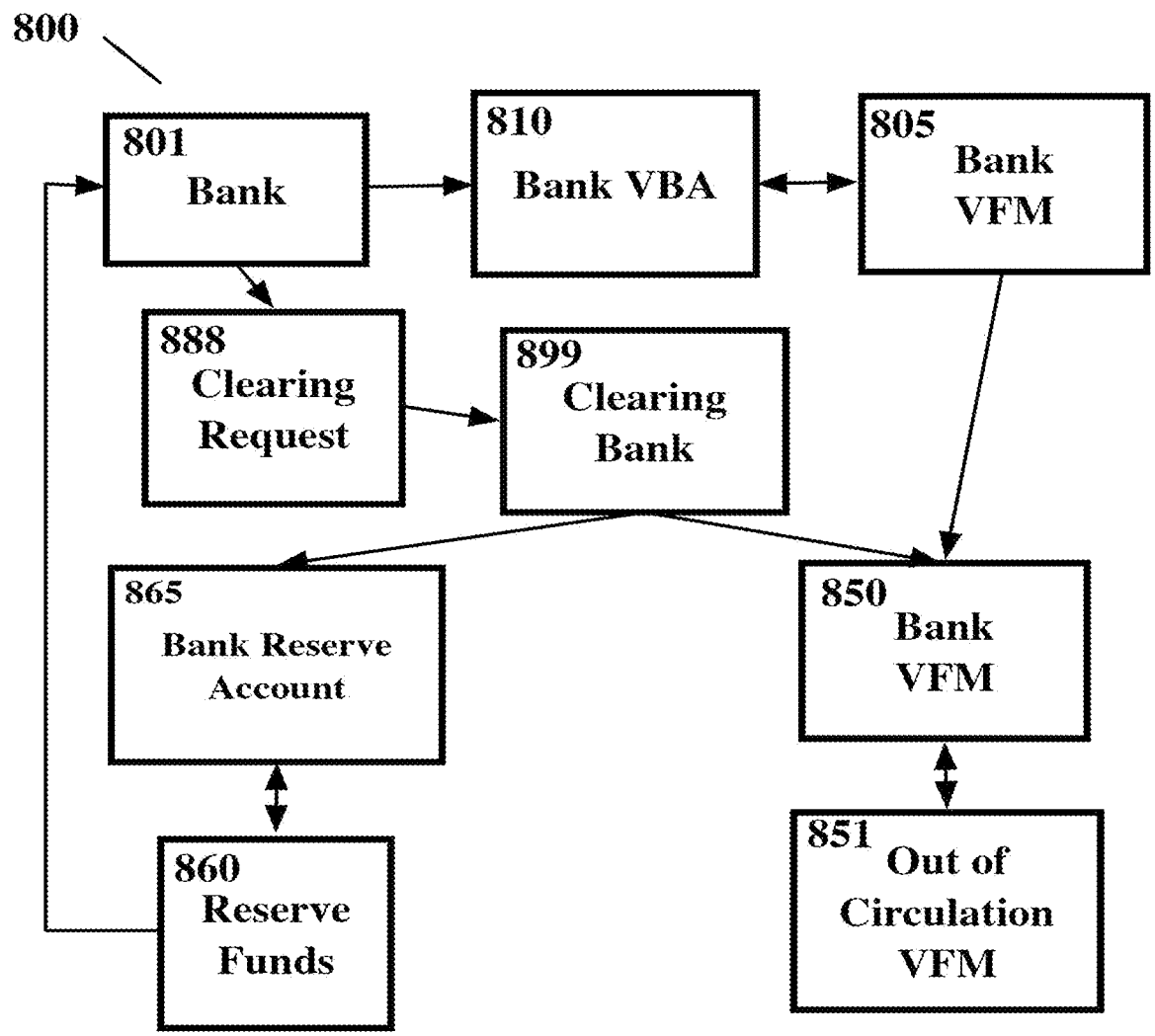
FIG. 8: A flowchart showing basic principles of clearing VFM among financial institutions in the system that are banks, showing an embodiment of first minted (oldest), first cleared approach to clearing VFM.

FIG. 8 helps elucidate basic principles of clearing VFM among financial institutions in the system that are banks, showing an embodiment 800 of first minted (oldest), first cleared approach to clearing VFM. As can be seen clearing functions are among banks, in analogous fashion to clearing of checks and the like in the real world. This a bank 801 can request clearing of VFM 805. A clearing request 888 is sent to all financial institutions in the system that are minting (qualified) banks. The requesting bank 801 must request its oldest (i.e. first in) VFM 805 is cleared first and so on. The bank 899 that originally minted the VFM 805 will approve the clearing request 888 and transfer real world funds to the requesting bank 801. Clearing bank 888 will receive the VFM as bank's VFM 850 and can take it out of circulation by converting the in-circulation VFM 850, to out of circulation VFM 851 by setting the out of circulation key. Clearing bank 888 can also recover the reserves real world funds 860 from its reserve account 765. Each qualified (minting) bank is only responsible for clearing VFM it originally minted.

III. Private Permissioned Blockchain Digital Fiat Currencies

In another aspect of this disclosure, blockchain digital currencies are provided herein. These currencies, sometimes referred to herein as virtual fiat money (VFM) differ from cryptocurrencies in several respects, and are similar to cryptocurrencies in other respects. They are similar to cryptocurrencies in utilizing the benefits of blockchain and related digital technology to provide security, authenticity, and traceability/immutable ledger that make the currency reliable. They differ from most other cryptocurrencies in that they are digital representations of real world currency and as such can be denominated in any real world currency. They are also different in they are created by fiat through a central authority rather than mined, are minted by banks, and preferably are backed by a fractional or a full reserve of the real world currency in which they are denominated. These currencies also differ in that they have no value or use outside of a private, permissioned network comprising financial institutions.

Generally, the digital fiat blockchain currencies comprise an electronic token having a blockchain and at least one digital security feature to enhance security, traceability, authenticity, or a combination thereof for that token. The blockchain provides an immutable ledger/trail of accountability and includes the entire history of each token from the time it was created. The digital fiat currency is used within a private system wherein all parties agree to participate and a central authority initially creates tokens that are out of circulation, and which have zero value.

While the currency is "out of circulation", the blockchain comprises an "out-of-circulation" block comprising a plurality of the following data:
  i) a real world currency ID key;
  ii) a null issuing financial institute (FI) key;

iii) a null issue timestamp;
iv) a null party name ID;
v) a null party account ID;
vi) a null party 'transfer to' timestamp; and
vii) a value key equal to zero;

When the currency is digitally minted into circulation in the private system, the blockchain is modified. Thus, when the currency is "in circulation" the blockchain comprises an out-of-circulation block and further includes an "in-circulation" block comprising a plurality of the following data:

i) a real world currency ID key;
ii) an issuing financial institute (FI) key;
iii) an issue timestamp;
iv) a party name ID;
v) a party account ID;
vi) a party 'transfer to' timestamp; and
vii) a value key specifying the value of the token expressed as the number of "minimal physical currency units" in circulation for the corresponding real world currency; and When the currency is "in circulation" in the system, the value indicated in the quantity key corresponds to an amount of funds in real-world currency which have been placed on reserve in the system by a bank having permission to put the digital currency into circulation in the private system. The private digital currency is created initially by fiat as out-of-circulation tokens, which cannot be mined or otherwise created.

Figure 3:
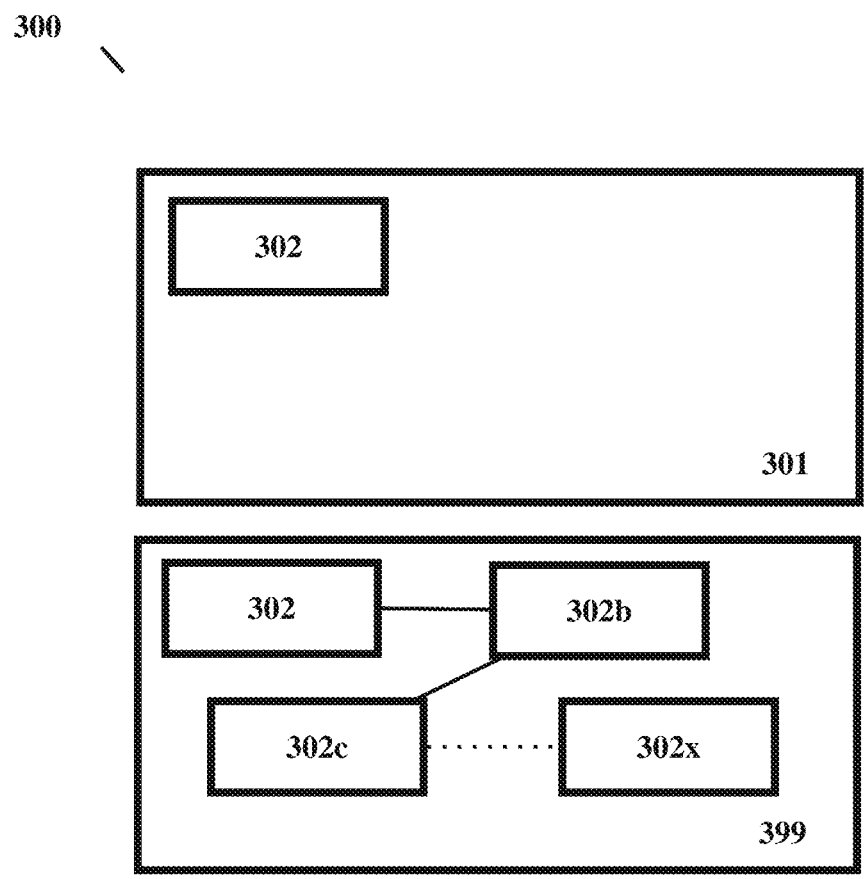
FIG. 3: A diagrammatic representation showing the electronic tokens for in-circulation digital currency as well as the out-of-circulation tokens, and the blockchain thereon.

The structure of the digital currency can be better understood with reference to the figures. FIG. 3 shows a schematic of the blockchain digital fiat currency 300 in accordance herewith. Both out-of-circulation tokens 301 and in-circulation tokens 399 generally comprise blockchain 302. As can be seen, out-of-circulation tokens 301 include a blockchain block 302a comprising out-of-circulation key that includes sufficient data to show that the token is out-of-circulation, has no value, no owner, and such. The out-of-circulation token 301 is converted to in-circulation digital currency 399 by appending block 302b to the blockchain 302. Block 302b comprises an in-circulation data key that includes data sufficient to establish that the token is in-circulation, the identity bank uniquely minted the currency, the corresponding real world currency in which the in-circulation digital currency is denominated, and the value of the in-circulation currency (expressed in units of the corresponding real world currency), and the current owner of the token 399. The skilled artisan will appreciate that a timestamp corresponding to the date and time of minting the in-circulation currency is also included.

It should be noted that each subsequent event in connection with any specific in-circulation currency 399 is appended to the blockchain 302 as blocks 302c . . . through 302x. Prior blocks on the blockchain are immutable by any party. In addition to the data stored in the blockchain as described herein, additional data can include a party to whom the in-circulation digital currency was 'transferred to' and the date of such transfer. In one embodiment, a future commitment to transfer, and the party to whom it will be transferred can also stored in the blockchain. In some cases, such commitment may be conditional. The latter functions are useful in connection with e.g. contracts with recurring payments, future payments obligations, financial guarantees or contingencies, and the like.

Also provided herein in connection with the blockchain digital fiat currencies are private networks for peer-to-peer financial transactions. Such systems allow for financial transactions analogous to those with traditional real world currencies in a virtual system using the blockchain digital fiat currencies provided herein. The private networks generally comprise a plurality of parties to the transaction, a unique electronic document for each peer-to-peer financial transaction, a plurality of networked servers, and a payment module for paying an amount in the transaction upon authorization or approval.

The plurality of parties each have a unique identity within the network. Each party also has at least one virtual account in the private network, and each is provided a digital signing key unique to that party for authorizing or approving peer-to-peer transactions.

The electronic document for each smart transaction has a unique identifier for that transaction and comprises at least the core terms of the peer-to-peer financial transactions. The identities of each party involved in the transaction are also contained in the electronic document.

The smart transaction document also comprises an authorization approval section for the document that requires use of the digital signing key unique to a party authorizing the transaction. A timestamp corresponding to the time a party authorized the transaction is also a part of or appended to the document.

The plurality of networked servers comprises at least one distributed database which provides electronic tokens representing the blockchain digital currency in the network. The database may be distributed via peer-to-peer connections or other useful connections allowing copies of the database to be shared with complete integrity among the users. The servers also comprise a database having the electronic document for each peer-to-peer financial transaction. Such data may be in the same or separate databases.

The payment module comprises such hardware and/or software as may be required to confirm that a transaction has been authorized or approved, and to subsequently execute payment by transferring blockchain digital currency from the payer, or by a third party payer, to an authorized payee. In one embodiment, the payment module includes computer instructions capable of being executed on the network. The instructions provide for at least transferring a specified amount of blockchain digital currency from the virtual account of a first party who authorizes a specified transaction, or a third party authorized by the first party who then authorizes the specified transaction, comprising payment of the specified amount of the blockchain digital currency to the virtual account of a second party, upon authorization of the specified transaction using the signing key;

Like the digital currency disclosed herein, the electronic document(s) for each peer-to-peer financial transaction comprise a blockchain of data that provides security, traceability, and an audit trail for each transaction.

Generally, if the authorization approval section for the electronic document for a transaction has been signed (i.e. authorized or approved) with the authorized key, the payment module is automatically and irrevocably executed. In one embodiment, the private network further comprises means for peer-to-peer data transfer as well as and peer-to-peer value transfer, i.e. no intermediary (bank or financial institution or the like) is required to effect payment. Preferably, the data transfer and the value transfer are substantially simultaneous.

The skilled artisan will appreciate that methods of conducting such private transactions are readily developed using the blockchain digital currency and the private network described above. Such private transactions can include virtually any transaction that can be conducted with physical, real world currency and are faster, easier, fully-trust based and payment is guaranteed upon authorization or approval or upon satisfaction of a contingency in an electronic contract defining financial transaction such as upon a date specified. Such transactions can range from payment of personal debts, including loans, IOUs, personal notes, or the like, payments for goods and services including personal or professional service, and payment of invoices or the like. Some of those transactions can be conducted through the use of more formal electronic payment methods and electronic contracts ('smart transactions") as described below.

IV. Electronic "Smart" Transactions and Contracts for Use with Blockchain Digital Currency.

In another aspect of the present disclosure, electronic transaction payments and electronic contracts are disclosed. These are referred to herein generally as 'smart transactions' and 'smart contracts', and preferably involve and are built on the systems and digital currency, and methods for their use disclosed in the foregoing sections.

Methods of transacting payments using blockchain digital currency in a private permissioned financial system are provided. The methods generally comprise the step of identifying a first party requesting a payment in blockchain digital currency in the system from a second party, and a second party determining whether to make a payment of blockchain digital currency to the first party, or by authorizing a third party to make payment to the first party on behalf of the second party.

Because the methods are preferably practiced within the systems disclosed herein, such as those provided in Section I above, the first and second parties are generally included within the system. Accordingly, each party generally holds at least one virtual account in the system. Each party also has a unique identifier ('ID') within the system.

Each of the first and second parties must have permission to access the smart transaction or smart contract. The second (paying) party must also have permission to digitally authorize or approve payment of smart transaction or smart contract within the system. Preferably the authorizing or approving parties are issued a digital signing key that is unique to that party for authorizing or approving a payment of digital currency in the system.

After the parties are identified, assigned unique IDs, and provided with a digital signing key, electronic communications are established between the first and second parties. The electronic communications can comprise any form of electronic communication within or without the system, provided that the parties can communicate regarding a payment of digital currency within the system. Regardless of the particular means of communication, preferably, the parties can share a resource locator, electronic link or the like that points to one or more documents or database entries in the system.

The method further comprises the steps of communicating an invoice and/or other transaction data (e.g. in the form of a smart transaction) from the first party detailing the specified amount of payment of digital currency requested, recording the transaction in a database in the system, and receiving transaction by the second party.

The received transaction is subsequently processed by the second party who can either approve the transaction, and authorize payment or reject it. If approved for payment, the second party (i.e. the party approving and authorizing/making payment) signs the transaction in the database (e.g. a smart transaction) with the digital signing key and thereby authorizes payment, with the specified amount of digital currency from its accounts.

The methods comprise the final steps of transferring the specified amount of blockchain digital currency from the appropriate virtual account (e.g. the account of the second party), to the virtual account of the first party; and recording the details of the approval, authorization, and payment in the database.

In various embodiments, the database described above is distributed within the system via network of private servers, e.g. via peer-to-peer connections or other useful connections.

The skilled artisan will appreciate that not every transaction will be approved—for any of a variety of reasons. If the transaction is not approved for the specified amount of payment it can be rejected in whole or part, disputed in whole or part, or approved for a different amount of payment. In one embodiment the original or an additional party can be requested to pay for another part of the remaining balance.

In a presently preferred embodiment, the smart transaction comprises a blockchain, which can be used to record the approval and subsequent payment in connection therewith. The blockchain preferably includes at least one block comprising data sufficient to detail the identities of the parties, each party's virtual account(s), the amount of the transaction, the date of the transaction, the approval or payment authorization status, the date of payment authorization, and the unique identity of the digital currency in connection therewith. The use of such blockchains allows the parties to readily review and audit the payment transactions.

In a further embodiment of the method for payment transactions, the methods involve a complete 'smart contract' approach including electronic offers, counteroffers, and acceptance, with subsequent smart transaction billing or invoicing as described above. Such smart contract can comprise obligations on the part of both parties that are either accomplished within or without the system, and such obligations can comprise obligations that can be accomplished digitally (e.g. providing an online service such as cybersecurity, server hosting, email services, etc.) or obligations that can only be completed in the physical world (e.g. sale a physical goods, or providing services in the physical world). Such methods further comprising, prior to the step of communicating an invoice or other equivalent request for payment transaction, the step of:

creating a proposed electronic transaction detailing a proposed transaction between the parties comprising:
1) providing an offer by one party (the offering party) to the other, said offer comprising:
i) one or more unique identifiers that specifically identify the digital smart transaction within the private system;
ii) at least the core obligations of the parties, including payment obligations and terms thereof;
iii) a blockchain comprising data that initially details at least the identity of each of the parties, the unique identifier of the electronic transaction, and the terms of the offer, including the specified amount(s) of any payment(s) of digital currency; and
iv) the digital signature of the offering party using the signing key unique to the offering party.

The foregoing substantially constitutes an electronic process of making an offer capable of being accepted to form a legal contract. As with any such offer, it can be accepted, rejected, or countered (i.e., rejected with a new offer). Accordingly the methods for forming a smart transaction in the system further comprise the subsequent step of 2) allowing the other prospective party to the transaction to accept the offer with the digital signing key to form an executed electronic transaction, reject the offer, or to counter with a digital counteroffer; and optionally allowing the prospective party to transfer a full or partial payment of the amount via an authorized third party.

If an executed electronic contract (e.g. a smart transaction) is formed, a block is appended to the blockchain of the executed electronic transaction comprising data sufficient to detail the time the digital offer was accepted; the specific electronic token(s) or a portion thereof, corresponding to the blockchain digital currency committed to the payment obligations of the electronic transaction in an amount sufficient to the payment obligations under the contract; and at least one virtual account in the system comprising said tokens; and the executed electronic transaction is recorded in the database with the digital signature of the parties thereto. Such contracts are legally enforceable. Moreover all terms of performance of the parties may be detailed in the electronic transaction. Further, dispute resolution options may be specified—including dispute resolution within the system. Policies such as refund policies, as well as guarantees or the lack thereof may be specified in the electronic transaction and may be readily enforced within the system. Such contracts are powerful in their ease of use, security, degree of trust, assured payment upon satisfactory completion, readily available audit trail, and provide all of the advantages of digital currency, and all of the advantages of blockchain technology, while offering low transaction costs and easy international transaction options.

In one embodiment, the smart transaction can provide for e.g. recurring payments, subscription models, down payments, seller/vendor/merchant financing with or without interest, interest free periods followed by interest accumulation, refunds, discounts and coupons, repeat customer/loyalty rewards, and more.

If the offer above is not accepted, but a counteroffer is made, the above steps and creating and making the offer are repeated with the counteroffer constituting the new 'offer'. The process is repeated until a smart transaction is formed, or until the offer is rejected and no further counteroffer is pending. If the original offer or any subsequent offer (i.e. counteroffer) is rejected and no additional counteroffer is pending, the proposed transaction is disregarded. For simple invoices (such as a vendor invoice) and merchant transactions which are paid short of their requested amount, the vendor or merchant can terminate the contract by either accepting the short payment and writing off the balance, re-submit a new invoice or transaction request, or ask the requested party to make an additional payment against the original short paid transaction.

The skilled artisan will appreciate the step of distributing the database comprising executed smart transactions is particular useful for allowing the parties to ensure the security of the smart transactions, as to review and audit the documents and have access to the details of such contracts by all parties related to each transaction. In addition to the electronic contracts themselves, in certain embodiments, the smart transactions can comprise other digital data such as standardized or self described EDI, ACH, ISO, XML, JSON, and other data formats that trading partner peers agreed to exchange with each other. The smart transactions can also include optional photographs, scanned documents, spreadsheets, and/or other electronic document attachments that may be useful to the parties to the contract, or to facilitate or improve the functioning of the system.

The methods of transacting payments as well as those involving more detailed 'smart transactions can arise out of any transaction or agreement—including a consumer-to-consumer transaction, a consumer-to-business transaction, a business-to-consumer transaction, a business-to-business transaction, or the like.

In one embodiment, the methods of using the smart transactions further comprise the step of appending, upon each subsequent event regarding the executed smart transactions, to the blockchain of the smart transactions at least one block comprising data detailing the subsequent event. Subsequent events might include events between the parties, or events such as the reporting of the failure of product or service, reviews of the performance of the various parties, or the like. Some such information may be restricted to the parties to the smart transaction, while others might be available to other members of the private system, such as financial institutions, or vendors and merchants, or other consumers. In some cases certain parties who were not party to the smart transaction may have permission to view the subsequent information, without reviewing all of the information in the underlying smart transaction. For example, in certain embodiments the price and other key terms may be only accessible to the parties to the executed smart transaction.

In one embodiment of implementing smart transactions, the step of communicating an invoice, occurs upon maturation of the payment obligations. The invoice can be automatically sent on maturation, triggered for example by a particular date, or by completion of one or more performance-related obligations. An invoice in the system could also be automatically triggered based on a milestone obligation in a smart transaction.

Upon completion of all obligations under the smart transaction or transaction, the blockchain of the smart transaction is appended with a block comprising data sufficient to indicate that all obligations, including the payment obligations, under the contract or smart transaction have been completed. Completion of all obligations under a contract or smart transaction may be viewable by other parties in the system—for example creditors and lenders may wish to be notified when a party's payment obligations to another party are completed.

In one embodiment, the methods further comprise incorporating at least one electronic security feature that allows the contents and the integrity of the executed smart transaction to be independently verified allowing parties to confirm the integrity of contents of the contract or smart transaction. Encrypting the executed contract or transaction with a public key such that only private key holders can decrypt the contract or smart transaction is a useful step in certain embodiments.

The scope of the invention is set forth in the claims appended hereto, subject, for example, to the limits of language. Although specific terms are employed to describe the invention, those terms are used in a generic and descriptive sense and not for purposes of limitation. Moreover, while certain presently preferred embodiments of the claimed invention have been described herein, those skilled in the art will appreciate that such embodiments are provided by way of example only. In view of the teachings provided herein, certain variations, modifications, and substitutions will occur to those skilled in the art. It is therefore to be understood that the invention may be practiced otherwise than as specifically described, and such ways of practicing the invention are either within the scope of the claims, or equivalent to that which is claimed, and do not depart from the scope and spirit of the invention as claimed.

What is claimed is:

1. A system for using private permissioned blockchain digital fiat currency in conjunction with real world currency comprising:
A) a plurality of private servers, each comprising:
1) non-volatile computer memory storing:
a) one or more distributed databases comprising:
i) at least one blockchain comprising a plurality of blocks;
a) a plurality of such blocks representing blockchain digital currency that is out of circulation in the system ("out-of-circulation blocks"), each such block comprising out-of-circulation data comprising a plurality of the following:
1) A real world currency ID key;
2) A null issuing financial institute (FI) key;
3) A null issue timestamp;
4) A null party name ID;
5) A null party account ID;
6) A null party 'transfer to' timestamp; and
7) A value key equal to zero;
and one or more unique digital security features on each out-of-circulation block to provide security and traceability, and to ensure authenticity for that block; and
b) a further plurality of such blocks representing blockchain digital fiat currency that is in circulation in the system ("in-circulation digital currency"), each such block comprising an out-of-circulation block and further comprising "in-circulation" data, such in-circulation data comprising a plurality of the following:
1) a real world currency ID key;
2) an issuing financial institute (FI) key;
3) an issue timestamp;
4) a party name ID;
5) a party account ID;
9) a party 'transfer to' timestamp; and
6) a value key specifying the value of the block expressed as the number of "minimal physical currency units" in circulation for a corresponding real world currency; and
b) computer readable instructions for:
creating the out-of-circulation blocks;
creating and implementing digital security features on the out-of-circulation blocks;
establishing permissions for parties to the system to access the out-of-circulation blocks;
creating and issuing public/private mint key pairs, and public/private decryption key pairs to parties in accordance with their permissions in the system;
digital minting of in-circulation digital currency from out-of-circulation blocks by appending in-circulation data thereto;
limiting access to the blockchains comprising out-of-circulation blocks to public/private mint key holders with permissions to append in-circulation data to the blockchain to digitally mint in-circulation digital currency;
limiting access to the blockchains comprising in-circulation digital currency to public/private decryption key holders with sufficient permissions to append new data on said blockchains;
accurately storing each blockchain so modified in the databases; and
creating and storing a unique timestamp corresponding to each such blockchain modification; and
c) a plurality of public/private mint key pairs each of which allows a permissioned party to digitally mint in-circulation digital currency by modifying blockchain comprising out-of-circulation blocks by appending in-circulation data thereto notwithstanding the unique digital security features thereon; and
2) one or more processors capable of executing the computer readable instructions; and
B) a network comprising connections between the private servers including means for distributing the databases between the servers comprising private peer-to-peer connections, or other private permissioned connections, or an electronic portal for accessing said databases; such that the out-of-circulation blocks and the in-circulation digital currency blocks are accessible to permissioned parties.

2. The system of claim 1 wherein the computer readable instructions further comprise instructions for determining requirements for reserved funds in real world currency to be provided by a qualified bank in proportion to the amount of in-circulation digital currency that is digitally minted by the bank from out-of-circulation blocks.

3. The system of claim 1 wherein the nonvolatile memory further stores a plurality of virtual bank accounts, virtual credit accounts, and virtual foreign exchange accounts;
wherein each such account is associated with a party who is a specific account holder that is
a) a bank or non-bank financial institution;
b) a customer or consumer;
c) a vendor, a merchant, a lender, or a borrower; or
d) any combination thereof; and
wherein each account holder has at least one account that is a virtual bank account, a virtual credit account, or a virtual foreign exchange account.

4. The system of claim 3 wherein one or more of the private servers on the network further comprises computer readable instructions for one or more of the following:
a) acquiring in-circulation digital currency in exchange for real world currency or traditional electronic funds denominated in real world currency;
b) redeeming in-circulation digital currency in exchange for real world currency or traditional electronic funds denominated in real world currency and subsequent removal of in-circulation digital currency from circulation;
c) clearing in-circulation digital currency in exchange for real world currency or traditional electronic funds denominated in real world currency, and optionally, subsequently removing in-circulation digital currency from circulation;
d) peer-to-peer payments between any two or more parties using the system;
e) peer-to-peer electronic contracts and data exchange between any two or more parties using the system; and
f) vendor invoicing via peer-to-peer electronic contracts, data exchange, and payments between a vendor and one or more parties using the system;
g) transferring in-circulation digital currency from party to party;
h) transferring in-circulation digital currency between accounts of the same party;

i) managing keys and permissions granted to parties using the system; and j) splitting blocks corresponding to in-circulation digital currency.

5. The system of claim 4 wherein computer readable instructions comprise code, subroutines, and protocols constituting an application program interface (API).

6. The system of claim 4 further comprising a transactions database that comprises electronic transaction data defining transactions between parties involving in-circulation digital currency, and which tracks transaction details and provides an audit trail of the transaction and the in-circulation digital currency in connection therewith.

7. The system of claim 6 further comprising sufficient network connections to provide access to the transactions database to parties to said electronic transactions where such parties have access permission.

8. The system of claim 4 wherein the computer readable instructions for splitting blocks comprising in-circulation digital currency further comprise instructions allowing creating a child block from a block ("parent block") comprising in-circulation digital currency by:
  providing the child block with sufficient data from the parent block to link the parent and child blocks in the system and provide traceability and an audit trail in connection therewith;
  transferring and assigning to the child block a portion of the value of the parent block; and
  recording on the blockchain comprising the parent block data sufficient to establish the existence of the child block, to link the parent block and the child block, and to revise the value of the parent block to reflect the value transferred and assigned to the child block.

9. The system of claim 1 wherein financial institutions are compensated through transaction, subscription, and other banking and financial service fees and not through fees for mining or creating blockchain digital currency.

10. A method for implementing and using a private permissioned blockchain digital fiat currency comprising the steps of:
  a) providing a plurality of private servers, each comprising:
    1) Non-volatile computer memory storing:
      i) one or more distributed databases comprising:
        (a) at least one blockchain comprising a plurality of blocks;
          i) a plurality of such blocks representing blockchain digital currency that is out of circulation in the system ("out-of-circulation block"), each such block comprising "out-of-circulation" data comprising a plurality of the following:
            1) a real world currency ID key;
            2) a null issuing financial institute (FI) key;
            3) a null issue timestamp;
            4) a null party name ID;
            5) a null party account ID;
            6) a null party 'transfer to' timestamp; and
            7) a value key equal to zero; and
          one or more unique digital security features generated for each out-of-circulation block to provide security and traceability, and to ensure authenticity for that block; and
          ii) a further plurality of such blocks representing blockchain digital fiat currency that is in circulation in the system ("in-circulation digital currency"), each such block comprising an out-of-circulation block and further comprising "in-circulation" data, such in-circulation data comprising a plurality of the following:
            1) a real world currency ID key;
            2) an issuing financial institute (FI) key;
            3) an issue timestamp;
            4) a party name ID;
            5) a party account ID;
            6) a party 'transfer to' timestamp; and
            7) a value key specifying the value of the block expressed as the number of "minimal physical currency units" in circulation for a corresponding real world currency; and
      Ii) computer readable instructions for:
        creating the out-of-circulation blocks;
        creating and implementing digital security features on the out-of-circulation blocks;
        establishing permissions for parties to the system to access the out-of-circulation blocks; and
        creating and issuing public/private mint key pairs and public/private decryption key pairs to parties in accordance with their permissions in the system;
        digital minting of in-circulation digital currency from out-of-circulation blocks by appending in-circulation data thereto;
        limiting access to the blockchains comprising out-of-circulation blocks to public/private mint key holders with permissions to append in-circulation data to the blockchain to digitally mint in-circulation digital currency;
        limiting access to the blockchains comprising in-circulation digital currency to public/private decryption key holders with sufficient permissions to append new data on said blockchains;
      accurately storing each blockchain so modified in the databases; and
      creating and storing a unique timestamp corresponding to each such blockchain modification; and
    2) one or more processors capable of executing the computer readable instructions;
  b) establishing a network among the private servers;
  c) creating connections between the private servers on the network, including means for distributing the databases between the servers, said connections comprising private peer-to-peer connections, or other private permissioned connections, or an electronic portal for accessing said databases; such that the out-of-circulation blocks and in-circulation digital currency are accessible only to permissioned parties;
  d) generating a unique public/private mint key pair that allows a permissioned party to digitally mint in-circulation digital currency by modifying the blockchain corresponding to out-of-circulation blocks by appending in-circulation data thereto notwithstanding the unique digital security features thereon;
  e) for each permissioned party electing to digitally mint an amount of in-circulation digital currency:
    1) digitally minting the amount of in-circulation digital currency by modifying the blockchain comprising one or more out-of-circulation blocks by appending thereto "in-circulation" data and determining an amount of real world funds to be reserved based on the amount digitally minted, and
    2) repeating step e(1) each time an amount of in-circulation digital currency is minted;

f) allowing a permissioned party-to use the in-circulation digital currency in one or more transactions in the private system; and
g) recording the details of the transactions in the blockchain comprising the in-circulation currency.

11. The method of claim 10 further comprising the step of establishing one or more virtual bank accounts, virtual credit accounts, and virtual foreign exchange accounts with one or more financial institutions;
   wherein each such account is associated with a party who is a specific account holder that is
   a) a bank or nonbank financial institution;
   b) a customer or consumer;
   c) a vendor, a merchant, a lender, or a borrower; or
   d) any combination thereof; and
   wherein each account holder has at least one account that is a virtual bank account, a virtual credit account, or a virtual foreign exchange account.

12. The method of claim 10 further comprising the step of providing computer readable instructions stored in the non-volatile memory for one or more of the following functions:
   a) acquiring in-circulation digital currency in exchange for real world currency or traditional electronic funds denominated in real world currency;
   b) redeeming in-circulation digital currency in exchange for real world currency or traditional electronic funds denominated in real world currency and subsequent removal of in-circulation digital currency from circulation;
   c) clearing of in-circulation digital currency in exchange for real world currency or traditional electronic funds denominated in real world currency and optionally, subsequently removing in-circulation digital currency from circulation;
   d) peer-to-peer payments between any two or more parties using the system;
   e) peer-to-peer electronic contracts and data exchange between any two or more parties using the system; and
   f) vendor invoicing via peer-to-peer electronic contracts, data exchange, and payments between a vendor and one or more parties using the system;
   g) transferring in-circulation digital currency from party to party;
   h) transferring in-circulation digital currency between accounts of the same party;
   i) management of keys and permissions granted to parties using the system; and
   j) splitting blocks corresponding to in-circulation digital currency.

13. The method of claim 10 wherein the one or more distributed databases further comprise a transaction database that comprises electronic transaction[s] data defining transactions between parties involving in-circulation digital currency and which tracks the transaction details and provides an audit trail of the transaction and the in-circulation digital currency in connection therewith.

14. The method of claim 10 wherein the one or more unique digital security features involve a public key encryption step that requires a private key to decrypt said features and access the blockchain comprising a block.

15. The method of claim 10 further comprising the step of utilizing the in-circulation digital currency in the system in a first-minted, first-utilized manner wherein the issue timestamp comprises data for determining which in-circulation digital currency was first-minted.

16. The method of claim 15 further comprising the steps of:
   splitting, where useful or required, the value represented by a block corresponding to in-circulation digital currency ("parent block") to create a child block;
   providing the child block with sufficient data from the parent block to link the parent and child blocks in the system and provide traceability and an audit trail in connection therewith;
   transferring and assigning to the child block a portion of the value of the parent block; and
   recording on the blockchain comprising the parent block data sufficient to establish the existence of the child block, to link the parent block and the child block; and to revise the value of the parent block to reflect the value transferred to the child block.

17. The method of claim 16 wherein the steps in connection with splitting a block require permissions only available to financial institutions.

18. The method of claim 10 wherein the allowing step further comprises transactions comprising peer-to-peer data transfer and peer-to-peer value transfer.

* * * * *